US009823623B2

(12) United States Patent
Tsang

(10) Patent No.: US 9,823,623 B2
(45) Date of Patent: Nov. 21, 2017

(54) CONVERSION OF COMPLEX HOLOGRAMS TO PHASE HOLOGRAMS

(71) Applicant: City University of Hong Kong, Kowloon (HK)

(72) Inventor: Peter Wai Ming Tsang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 450 days.

(21) Appl. No.: 14/305,494

(22) Filed: Jun. 16, 2014

(65) Prior Publication Data

US 2015/0277377 A1  Oct. 1, 2015

Related U.S. Application Data

(60) Provisional application No. 61/971,294, filed on Mar. 27, 2014.

(51) Int. Cl.
  *G03H 1/26* (2006.01)
  *G03H 1/08* (2006.01)

(52) U.S. Cl.
  CPC ..... *G03H 1/0841* (2013.01); *G03H 2001/085* (2013.01); *G03H 2225/32* (2013.01); *G03H 2226/04* (2013.01)

(58) Field of Classification Search
  CPC ............. G03H 1/0841; G03H 2226/04; G03H 2001/085; G03H 2225/32
  See application file for complete search history.

(56) References Cited

U.S. PATENT DOCUMENTS

| 4,904,064 A | * | 2/1990 | Lagerwall | ............ | G09G 3/3629 349/172 |
| 5,045,952 A | * | 9/1991 | Eschbach | ............. | H04N 1/4053 358/3.03 |

(Continued)

FOREIGN PATENT DOCUMENTS

| CN | 102087503 A | 6/2011 |
| CN | 102087503 B | 7/2012 |

(Continued)

OTHER PUBLICATIONS

W. T. Cathey, Jr; "Phase Holograms, Phase-Only Holograms, and Kinoforms", Dec. 1969.*

(Continued)

*Primary Examiner* — Sath V Perungavoor
*Assistant Examiner* — Philip Dang
(74) *Attorney, Agent, or Firm* — Amin, Turocy & Watson, LLP

(57) ABSTRACT

Fast processing of information represented in digital holograms is provided to facilitate converting a complex Fresnel hologram into a phase-only hologram, which can be a localized error diffusion and redistribution (LERDR) hologram, for displaying 3-D holographic images representative of a 3-D object scene. For a complex Fresnel hologram representing a 3-D object scene, a holographic generator component (HGC) can directly apply an LERDR process to the complex hologram to facilitate converting the complex hologram into an LERDR hologram. As part of the LERDR process, the HGC can partition the complex hologram into segments, convert the complex values of the pixels in each segment to phase-only values, and apply error diffusion to each segment to facilitate generating the phase-only hologram. The HGC can apply error redistribution to the last pixel of each segment to produce the resulting LERDR (Continued)

hologram, which can be displayed on a phase-only display device.

34 Claims, 20 Drawing Sheets

(56) References Cited

U.S. PATENT DOCUMENTS

| | | | | |
|---|---|---|---|---|
| 5,194,971 | A * | 3/1993 | Haines | G03H 1/0406 359/22 |
| 5,483,364 | A * | 1/1996 | Ishimoto | G03H 1/0808 359/15 |
| 5,696,601 | A * | 12/1997 | Metcalfe | H04N 1/4052 358/3.03 |
| 5,946,455 | A * | 8/1999 | Tresser | H04N 1/4053 358/1.9 |
| 5,974,228 | A | 10/1999 | Heitsch | |
| 6,101,001 | A * | 8/2000 | Tresser | H04N 1/4053 358/1.9 |
| 6,937,365 | B2 * | 8/2005 | Gorian | H04N 1/4053 358/1.9 |
| 6,975,786 | B1 * | 12/2005 | Warr | G02B 5/32 359/15 |
| 7,027,660 | B2 * | 4/2006 | Hersch | B41M 3/14 382/257 |
| 7,088,480 | B1 * | 8/2006 | Javidi | G03H 1/0866 359/10 |
| 7,212,630 | B2 | 5/2007 | Javidi | |
| 7,221,760 | B2 | 5/2007 | Javidi et al. | |
| 7,307,767 | B2 * | 12/2007 | Gerspach | G02B 5/32 359/1 |
| 8,150,033 | B2 | 4/2012 | Javidi et al. | |
| 8,274,705 | B2 * | 9/2012 | Chang | H04N 1/4052 358/3.01 |
| RE43,707 | E * | 10/2012 | Kimpe | G09G 3/20 345/690 |
| 8,320,694 | B2 * | 11/2012 | Chang | H04N 1/4052 358/3.03 |
| 8,384,973 | B2 * | 2/2013 | Leister | G03H 1/0808 359/21 |
| 8,432,590 | B2 * | 4/2013 | Cable | G03H 1/2205 359/32 |
| 8,654,048 | B2 * | 2/2014 | Collings | G03H 1/2286 345/38 |
| 2004/0255236 | A1 | 12/2004 | Collart | |
| 2005/0041746 | A1 | 2/2005 | Rosen et al. | |
| 2005/0122549 | A1 * | 6/2005 | Goulanian | G03H 1/30 359/3 |
| 2006/0001921 | A1 | 1/2006 | Bailey et al. | |
| 2006/0078113 | A1 | 4/2006 | Javidi | |
| 2007/0024999 | A1 | 2/2007 | Crossland et al. | |
| 2007/0086662 | A1 * | 4/2007 | Cho | H04N 1/4052 382/233 |
| 2008/0218864 | A1 | 9/2008 | Javidi | |
| 2009/0002787 | A1 * | 1/2009 | Cable | G03H 1/2294 359/9 |
| 2009/0207466 | A1 * | 8/2009 | Bucklay | G02B 3/14 359/9 |
| 2009/0219380 | A1 | 9/2009 | Cable | |
| 2010/0085276 | A1 * | 4/2010 | Cable | G03H 1/2205 345/6 |
| 2010/0149139 | A1 | 6/2010 | Kroll et al. | |
| 2011/0228365 | A1 * | 9/2011 | Tsang | G03H 1/08 359/9 |
| 2011/0251905 | A1 * | 10/2011 | Lawrence | G03H 1/0005 705/15 |
| 2011/0261427 | A1 * | 10/2011 | Hart | G03H 1/2249 359/22 |
| 2012/0008181 | A1 * | 1/2012 | Cable | G03H 1/08 359/9 |
| 2013/0265623 | A1 * | 10/2013 | Sugiyama | G02B 27/0172 359/13 |
| 2016/0110564 | A1 | 4/2016 | Tsang | |

FOREIGN PATENT DOCUMENTS

| | | |
|---|---|---|
| CN | 103279916 A | 9/2013 |
| GB | WO 2005/059660 A2 * | 6/2005 |
| NO | 2009121709 | 10/2009 |
| WO | 2005059881 | 6/2005 |
| WO | 2005059881 A2 | 6/2005 |
| WO | 2006134404 | 12/2006 |
| WO | 2006134404 A1 | 12/2006 |

OTHER PUBLICATIONS

Ayman Al Falou, "Segmented phase-only filter binarized with a new error diffusion approach", Journal of Optics A: Pure and Applied Optics, Feb. 11, 2005.*
Tomohiro Kiire, "Three-dimensional displacement measurement for diffuse object using phase-shifting digital holography with polarization imaging camera", Optical Society of America, Dec. 1, 2011.*
P.W.M. Tsang, "Novel method for converting digital Fresnel hologram to phase-only hologram based on bidirectional error diffusion", Optics Express, Sep. 27, 2013.*
Donald E. Knuth, "Digital Halftones by Dot Diffusion", ACM Transactions on Graphics, vol. 6, No. 4, Oct. 1987.*
Andrew E. Yagle, "Complex Numbers and Phasors", The University of Michigan, Ann Arbor, Fall 2005.*
Andrew Kirk, "A generalisation of the error diffusion method for binary computer generated hologram design", Optics Communications 92 (1992) 12-18.*
Jiwoon Yeom, "Phase-only hologram generation based on integral imaging and its enhancement in depth resolution", Chinese Optics Letters Dec. 10, 2011.*
U.S. Appl. No. 11/867,570, filed Oct. 4, 2007, Javidi.
Tudela et al. "Full complex Fresnel holograms displayed on liquid crystal devices." Journal of Optics A: Pure and Applied Optics, Institute of Physics Publishing, J. Opt. A: Pure Appl. Opt. 5 (2003), Jan. 17, 2003, S1-S6.
Hsieh et al. "Improvement of the complex modulated characteristic of cascaded liquid crystal spatial light modulators by using a novel amplitude compensated technique." OE Letters, Optical Engineering, Jul. 2007/vol. 46(7), Jul. 2, 2007, 3 pages.
Makowski et al. "Complex light modulation for lensless image projection." Chinese Optics Letters, col. 9(12), 120008(2011), Dec. 10, 2011, 3 pages.
Hsueh, et al. "Computer-generated double-phase holograms" published in Applied Optics; Dec. 15, 1978, 10 pages.
Reichelt et al. "Full-range, complex spatial light modulator for real-time holography." Optics Letters vol. 37, No. 11, Jun. 1, 2012, pp. 1955-1957.
Li et al. "Color holographic display using a phase-only spatial light modulator." Digital Holography and 3D Imaging, Technical Digest, Apr. 21-25, 2013, 3 pages.
Song et al. "Optimal synthesis of double-phase computer generated holograms using a phase-only spatial light modulator with grating filter." Optics Express vol. 20, No. 28, Dec. 31, 2012, 10 pages.
Liu et al. "Complex Fresnel hologram display using a single SLM," Applied Optics, vol. 50, No. 34, Dec. 1, 2011, pp. 128-135.
Tsang, et al. "Novel method for converting digital Fresnel hologram to phase-only hologram based on bidirectional error diffusion", Optics Express, Oct. 7, 2013, 7 pages.
Yeom et al. "Phase-only hologram generation based on integral imaging and its enhancement in depth resolution." Chinese Optics Letters, col. 9(12), Dec. 10, 2011, 4 pages.
Buckley. "Holographic Laser Projection Technology." SID International Symposium Digest of Technical Papers 2008, pp. 1074-1079.
Cable et al. "Real-time Binary Hologram Generation for High-quality Video Projection Applications." SID International Symposium Digest of Technical Papers 2004, pp. 1431-1433.
Buckley. "Real-Time Error Diffusion for Signal-to-Noise Ratio Improvement in a Holographic Projection System." Journal of Display Technology, vol. 7, No. 2, Feb. 2011, pp. 70-76.
Wikipedia. "Floyd-Steinberg Dithering" published online at [http://en.wikipedia.org/wiki/Floyd%E2%80%93Steinberg_dithering],

(56) References Cited

OTHER PUBLICATIONS last modified on Oct. 23, 2014, retrieved on Feb. 4, 2015, 2 pages.
Gerchberg et al. "A Practical Algorithm for the Determination of Phase from Image and Diffraction Plane Pictures." Optik, vol. 35 (No. 2), Received Nov. 29, 1971, pp. 237-246.
Weng et al. "Generation of real-time large computer generated hologram using wavefront recording method."Optics Express, vol. 20, No. 4, Feb. 13, 2012, pp. 4018-4023.
Tsang et al. "Holographic video at 40 frames per second for 4-million object points." Optics Express, vol. 19, No. 16, Aug. 1, 2011, pp. 15205-15211.
Tsang, et al., "Novel method for converting digital Fresnel hologram to phase-only hologram based on bidirectional error diffusion," Optics Express, vol. 21, No. 20, Oct. 7, 2013, pp. 23680-23686.
Tashima, et al., "Known plaintext attack on double random phase encoding using fingerprint as key and a method for avoiding the attack," Jun. 21, 2010 / vol. 18, No. 13 / Optics Express / pp. 13772-13781.
Peng, et al. "Known-plaintext attack on optical encryption based on double random phase keys," Optics Letters / vol. 31, No. 8 / Apr. 15, 2006 / pp. 1044-1046.
Situ, et al., "Double random-phase encoding in the Fresnel domain," Optics Letters / vol. 29, No. 14 / Jul. 15, 2004 / pp. 1584-1586.
Refregier, et al. "Optical image encryption based on input plane and Fourier plane random encoding," Apr. 1, 1995 / vol. 20, No. 7 / Optics Letters / pp. 767-769.
Unnikrishnan, et al. "Optical encryption by double-random phase encoding in the fractional Fourier domain," Jun. 15, 2000 / vol. 25, No. 12 / Optics Letters / pp. 887-889.
ISO/IEC. "Information technology—Automatic identification and data capture techniques—QR Code 2005 bar code symbology specification" ISO/IEC 18004: Second Edition—Sep. 1, 2006, Retrieved on Jan. 16, 2015, 124 pages.
Ren, et al. "Secure and noise-free holographic encryption with a quick-response code," Chin. Opt. Lett. 12, Jan. 10, 2014, 4 pages.
Barrera, et al., "Optical encryption and QR codes: Secure and noise-free information retrieval," Mar. 11, 2013 / vol. 21, No. 5 / Optics Express / pp. 5373-5378.
Zhang, et al. "Vulnerability to chosen-plaintext attack of a general optical encryption model with the architecture of scrambling-then-double random phase encoding," Optics Letters / vol. 38, No. 21 / Nov. 1, 2013, pp. 4506-4509.
Frauel, et al., "Resistance of the double random phase encryption against various attacks," Aug. 6, 2007 / vol. 15, No. 16 / Optics Express /pp. 10253-10256.
Carnicer, et al. "Vulnerability to chosen-cyphertext attacks of optical encryption schemes based on double random phase keys," Optics Letters / vol. 30, No. 13 / Jul. 1, 2005 / pp. 1644-1646.
Gong, et al. "Multiple-image encryption and authentication with sparse representation by space multiplexing," Applied Optics, vol. 52, No. 31, Nov. 1, 2013, pp. 7486-7493.
Chen, et al. "Optical color image encryption based on Arnold transform and interference method", Optics Communicatiosn 282 (2009) pp. 3680-3685.
Chen, et al. "Double random phase encoding using phase reservation and compression", J. Opt. 16 (2014) 025402 (7pp).
Non-Final Office Action dated Nov. 6, 2015 for U.S. Appl. No. 14/029,144, 29 pages.
Office Action for U.S. Appl. No. 14/516,332 dated Feb. 16, 2016, 54 pages.
Tsang et al. "Fast conversion of digital Fresnel hologram to phase-only hologram based on localized error diffusion and redistribution," Opt. Express 22, 5060-5066 (2014). Retrieved on Mar. 26, 2016, 7 pages.
Final Office Action dated Mar. 30, 2016 for U.S. Appl. No. 14/029,144, 22 pages.
Office Action dated Apr. 1, 2016 for U.S. Appl. No. 14/076,717, 44 pages.
Office Action dated Sep. 19, 2016 for U.S. Appl. No. 14/516,332, 57 pages.
Dezhao Kong; Liangcai Cao; Hao Zhang; Qingsheng He; Guofan Jin; "Holographic lensless interference encryption based on single spatial light modulator"; 2016 IEEE 14th International Conference on Industrial Informatics (INDIN); Year: Feb. 2016; pp. 562-566.
Notice of Allowance dated May 24, 2017 for U.S. Appl. No. 14/516,332, 113 pages.

\* cited by examiner

CONVERSION OF COMPLEX HOLOGRAMS TO PHASE HOLOGRAMS

CROSS-REFERENCE TO RELATED APPLICATION

This application claims the benefit of priority to U.S. Provisional Application No. 61/971,294, filed Mar. 27, 2014, and entitled "Fast conversion of digital Fresnel hologram to phase-only hologram based on localized error diffusion and redistribution," the entirety of which is incorporated herein by reference.

TECHNICAL FIELD

The subject disclosure relates generally to holograms, e.g., to conversion of complex holograms to phase holograms.

BACKGROUND

With the advancement of computers, digital holography has become an area of interest and has gained popularity. Research findings derived from this technology can enable digital holograms to be captured optically or generated numerically, and to be displayed with holographic display devices such as a liquid crystal on silicon (LCoS) display device or a spatial light modulator (SLM) display device. Holograms generated in this manner can be in the form of numerical data that can be recorded, transmitted, and processed using digital techniques. On top of that, the availability of high capacity digital storage and wide-band communication technologies also lead to the emergence of real-time video holography, casting light on the future of, for example, a three-dimensional (3-D) television system.

A Fresnel hologram of a 3-D scene can be generated numerically by computing the fringe patterns emerged from each object point to the hologram plane. The Fresnel hologram of the 3-D scene can be used to reconstruct and display 3-D holographic images that can recreate or represent the original 3-D scene from various visual perspectives (e.g., various viewing angles).

A hologram can have a number of advantages. For instance, a hologram can present a true 3-D view of an object scene (e.g., commonly referred to as a reconstructed image) to observers. Also, the reconstructed image can be directly projected onto a display screen without the need of focusing lens. Further, a hologram can be resistant to damage and noise contamination.

A hologram is often considered to be the ultimate solution to 3-D display, as it can record the complex wavefront emitted from a 3-D object scene. A complex hologram can reproduce desirable (e.g., excellent quality) 3-D images that can be free from the unwanted images that can be present in other types of holograms (e.g., amplitude). A desirable scenario can be displaying the complex hologram with a single complex device, employing illumination with a coherent light source (e.g., a light-emitting diode (LED) source).

However, in reality, a conventional system for displaying a complex hologram can have some drawbacks. Since a complex hologram is a complex image, optical integration of a pair of displays to present the real and imaginary components of the complex image, or other pair of orthogonal components, such as magnitude and phase, can be required. Also, due to the fine resolution of a holographic display, precise alignment of a pair of displays can be a significant issue, and can be difficult to achieve in practice. As a result, a display system for displaying complex holograms can be expensive and difficult to construct.

The above-described description is merely intended to provide a contextual overview relating to digital holograms, and is not intended to be exhaustive.

SUMMARY

The following presents a simplified summary of various aspects of the disclosed subject matter in order to provide a basic understanding of some aspects described herein. This summary is not an extensive overview of the disclosed subject matter. It is intended to neither identify key or critical elements of the disclosed subject matter nor delineate the scope of such aspects. Its sole purpose is to present some concepts of the disclosed subject matter in a simplified form as a prelude to the more detailed description that is presented later.

One or more embodiments, such as one or more systems, methods, computer readable storage mediums, and techniques disclosed herein, relate to processing and generating holograms. Disclosed herein is a system comprising at least one memory that stores computer-executable components, and at least one processor, coupled to the at least one memory, that facilitates execution of the computer-executable components stored in the at least one memory. The computer-executable components comprising a holographic generator component that receives or generates a complex hologram that represents an object scene, wherein the complex hologram comprises a set of pixels, and the complex hologram comprises a magnitude portion and a phase portion. The computer-executable components also comprising a hologram processor component that partitions the complex hologram into a set of hologram segments comprising a hologram segment, converts a complex value of a pixel of the hologram segment to a phase value, and performs an error diffusion process to facilitate diffusion of an error associated with the complex value being converted to the phase value to facilitate generation of a phase hologram that corresponds to the complex hologram.

Also disclosed herein is a method that comprises converting, by a system comprising a processor, a complex value of a member of a subset of members of a hologram portion of a complex hologram to a phase value, wherein the complex hologram represents an object scene, the complex hologram comprises a magnitude portion and a phase portion, and the complex hologram is partitioned into a set of hologram portions comprising the hologram portion. The method also comprises performing, by the system, an error diffusion process to facilitate diffusing an error associated with the converting of the complex value to the phase value to facilitate generating a phase hologram that corresponds to the complex hologram.

Further disclosed herein is a non-transitory computer-readable medium storing computer-executable instructions that, in response to execution, cause a system comprising a processor to perform operations. The operations comprise partitioning a complex hologram, comprising a set of members, into a set of hologram segments comprising a hologram segment that comprises a subset of members of the set of members, wherein the complex hologram comprises a magnitude portion and a phase portion and represents an object scene. The operations also comprise modifying a complex value of a member of the subset of members of the hologram segment to a phase-only value. The operations further comprise applying an error diffusion process to facilitate diffusing an error associated with the modifying of the complex value to the phase-only value to facilitate generating a phase-only hologram that corresponds to the complex hologram.

The disclosed subject matter also includes a system comprising means for partitioning a complex hologram, comprising a set of pixels, into a set of hologram portions comprising a hologram portion that comprises a subset of pixels of the set of pixels, wherein the complex hologram comprises a magnitude portion and a phase portion and represents an object scene. The system also comprises means for converting a complex value of a pixel of the subset of pixels of the hologram portion to a phase value. The system further comprises means for performing an error diffusion process in connection with the pixel to facilitate diffusing an error associated with the converting of the complex value to the phase value to facilitate generating a phase hologram that corresponds to the complex hologram.

The following description and the annexed drawings set forth in detail certain illustrative aspects of the disclosed subject matter. These aspects are indicative, however, of but a few of the various ways in which the principles of the disclosed subject matter may be employed, and the disclosed subject matter is intended to include all such aspects and their equivalents. Other advantages and distinctive features of the disclosed subject matter will become apparent from the following detailed description of the disclosed subject matter when considered in conjunction with the drawings.

DETAILED DESCRIPTION

Figure 1:
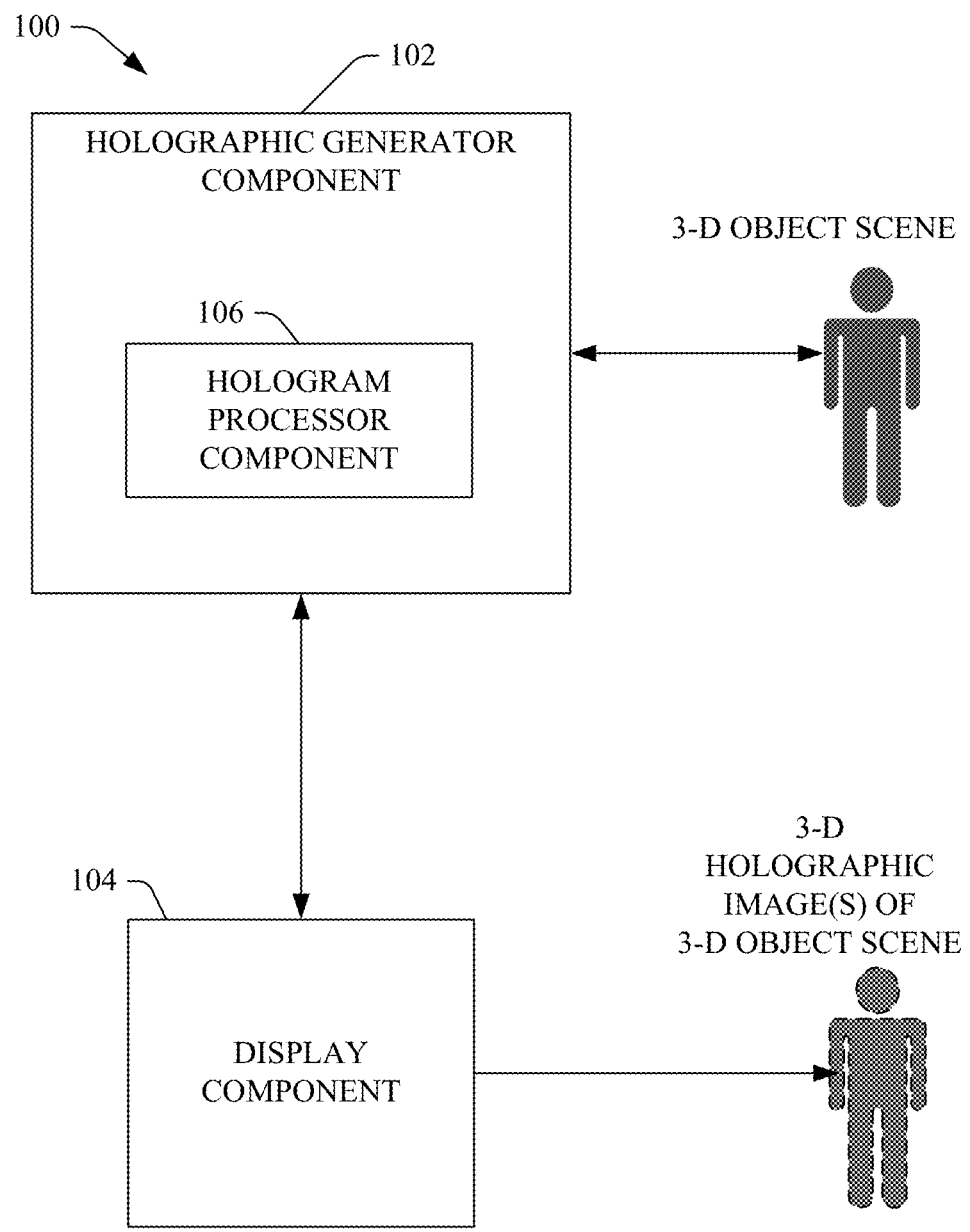
FIG. 1 depicts a block diagram of a system that can efficiently and quickly (e.g., in real time or at least near real time) convert a complex 3-D hologram(s) (e.g., a complex full-parallax 3-D Fresnel hologram(s)) of a real or synthetic 3-D object scene(s) to a phase hologram(s), and display 3-D holographic images, based at least in part on the phase hologram(s), on a display component (e.g., a phase-only or phase-specific display component), in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

Computer-generated holography (CGH) has undergone encouraging development in the past two decades. One of the major factors leading to the success in CGH can be attributed to the emergence of fast algorithms that can speed up the computation of the digital hologram by a significant amount. On top of that, the rapid advancement of computing and semiconductor technologies have enabled a medium size digital hologram to be generated numerically quickly using a relatively low cost commodity personal computer (PC) and hardware, such as a graphic processing unit (GPU) or a field programmable gate array (FPGA). Despite this somewhat favorable progress in the area of CGH, the display of a hologram can be a difficult problem that can impose, to a certain extent, a bottleneck to the practical realization of the holographic technology.

One problem is that high resolution devices that are capable of displaying holograms, such as Liquid Crystal on Silicon (LCoS) display devices, typically are only capable of displaying either the magnitude component or the phase component of a complex hologram (e.g., a complex amplitude hologram that comprises a magnitude component (e.g., an amplitude magnitude component or portion) (having a magnitude value) and a phase component or portion (having a phase value)). A straightforward solution to this problem is to employ two spatial light modulators (SLMs) to respectively display the real and imaginary components, or the amplitude and phase information, of a complex hologram, and combining the reconstructed images of each component using a certain optical means. Likewise, a complex hologram can be simulated with a double phase-only hologram, and displayed with a pair of phase-only SLMs. In some implementations, the pair of SLMs can be replaced by a single SLM device, displaying a pair of holograms and subsequently merging or integrating the reconstructed wavefront optically through a grating, such as a high-resolution grating.

Although such approaches can be somewhat effective, the optical setups of these conventional approaches can be rather complicated, with a precise alignment of the building blocks being desirable (e.g., required), and can limit their applications in practice. Also, for some conventional methods, such as the method relating to double phase-only holograms, the amount of computation that has to be performed to generate the hologram can make employing such an approach difficult or impractical. Further, when using an approach such as that with the double phase-only hologram, the area of the SLM allocated to each component of the hologram may be reduced to half of its original size.

Another approach can be to convert a complex hologram into an amplitude image by retaining only the real component of the hologram. However, the amplitude hologram is comprised of semi-transparent fringes that can lower optical efficiency, as the illumination beam can be attenuated by the opacity of the fringe patterns. Also, the removal of the imaginary part of the hologram can lead to the undesirable generation of a twin image. Although the twin image can be suppressed at least somewhat by using optical filtering, or by adding an inclined reference beam signal to the complex hologram prior to removing the imaginary component, the twin image can consume about half of the frequency spectrum.

Still another approach can be to generate a pure phase hologram (e.g., a phase-only hologram (POH)) for a 3-D scene (e.g., by converting a complex hologram to a phase-only hologram) and display the hologram on a single phase-only SLM display device. A POH can have a number of attractive features when compared with complex holograms or amplitude holograms. For instance, a reconstructed image of a POH can be inherently free from the zero order diffraction and the twin image. Also, a POH can be directly displayed with a phase-only display device (e.g., a single phase-only spatial SLM display device), and can exhibit higher optical efficiency and a fuller utilization of the frequency spectrum.

Despite these favorable features associated with a POH, there can be problems associated with generating a POH. For instance, using certain conventional techniques that remove the magnitude component can lead to relatively heavy and undesirable (e.g., unacceptable) distortion on or degradation of the reconstructed image. Further, this process can be computationally intensive.

To attempt to alleviate some problems associated with generating a POH, a Gerberg-Saxton algorithm, or an iterative Fresnel transform, often can be adopted to compute the phase hologram in an iterative manner, so that the reconstructed image can match with a target planar image. However, the phase hologram generated with such approaches can be computationally intensive, especially if the object scene is composed of many planar images each positioned at different axial distance from the hologram, and typically such a phase hologram is only applicable to represent a two-dimensional (2-D) image. One conventional method for generating a POH relatively fast can be the "One-Step Phase Retrieval (OSPR) process." In this OSPR method, a complex hologram is generated from the points in an object space that has been perpetuated with a random phase signal that can be first added to the object points prior to the generation of the digital hologram. Subsequently, a POH can be obtained by retaining only the phase component of the complex hologram. The phase component of the hologram, which may be quantized with thresholding or error diffusion, can be displayed with a phase-only device. The reconstructed images of the holograms generated with the OSPR process generally can be noisy and consequently multiple sub-frames, each representing the same object scene added with different random phase patterns, typically have to be presented rapidly to the observers to try to average out the speckle noise. However, these sub-frames can involve more computation to generate, and also typically have to be displayed at a relatively high frame rate to avoid the visual problem of flickering.

Yet another method has been developed that can quickly convert a complex digital Fresnel hologram into a phase-only hologram, based on bidirectional error diffusion (BERD), to facilitate overcoming the intensive computation issue of conventional approaches and the issues regarding the quality of reconstructed images. Such method for quickly converting a complex digital hologram into a phase-only hologram can involve the associated computation being conducted in a sequential, pixel after pixel manner, for example. Experimental evaluation reveals that high fidelity can be preserved on the reconstructed image of a POH obtained using the BERD technique, as compared to one derived directly from the original complex hologram. With such method, the conversion time can increase as the size of hologram increases, so the conversion time may be undesirably long for larger sized holograms. With older SLM devices, this generally would not be an issue because the size of these older SLM devices can be within 2K-by-2K pixels. However, more recent display devices, such as a high-resolution LCoS display device, can be adopted as holographic display devices and can have a larger size of 4K-by-4K pixels, and it is possible that an even larger 8K-by-8K-sized holographic display will be produced in the near future. As a result, an even faster conversion speed can be desired. Also, the issue of conversion speed can be even more problematic with regard to the display of color holograms, wherein 3 independent phase-only holograms, each representing a different one of the primary colors, have to be generated.

To that end, presented are techniques for fast (e.g., at video rate in real-time or at least near real-time) processing of information represented in digital holograms to facilitate converting a complex Fresnel hologram into a single phase hologram (e.g., a POH, phase-specific hologram, or pure phase hologram), and displaying 3-D holographic images representative of a 3-D object scene on a display device based at least in part on the phase hologram. In accordance with various implementations, the phase hologram can be a localized error diffusion and redistribution (LERDR) hologram that can represent the 3-D object scene and preserve favorable visual quality of the reconstructed holographic image of the 3-D object scene. The LERDR hologram process also can have high optical efficiency, the LERDR hologram can be free from the problems of twin images and zero-order diffraction found in some conventional hologram generation methods.

A holographic generator component (HGC) can receive or generate a complex hologram (e.g., complex full-parallax 3-D Fresnel hologram) that can represent a 3-D object scene from a number of different visual perspectives (e.g., from a number of different viewing angles). In some implementations, the HGC can generate a complex hologram of the 3-D object scene at video rate (e.g., a standard video rate or a video rate of approximately 40 frames per second or faster) in real or near real time.

The HGC can comprise a hologram processor component that can facilitate generating complex holograms, converting complex holograms to phase holograms, and displaying of phase holograms on a display device at a desired rate (e.g., at video rate or faster than video rate, in real-time or at least near real-time). For a complex Fresnel hologram representing a 3-D object scene, the hologram processor component can facilitate directly applying the LERDR process to the complex hologram to facilitate converting the complex hologram into a phase hologram. As part of the LERDR process, the hologram processor component can partition the complex hologram into a set of segments (e.g., segments of the complex hologram), convert the pixels in each segment to respective phase values (e.g., phase-only values), and apply error diffusion to each of the segments to facilitate generating the phase hologram. The hologram processor component also can apply error redistribution to the phase hologram to produce the resulting LERDR hologram. For instance, the hologram processor component can apply error distribution to each segment of the phase hologram to facilitate redistributing the error associated with the last pixel of each segment, so that the error associated with the last pixel in each segment can be diffused to another segment adjacent to such segment in the hologram. In some implementations, the hologram processor component can apply low-pass filtering to a segment (e.g., to the error signal associated with the last pixel of the segment) to facilitate redistributing the error associated with the last pixel of each segment.

With the hologram processor component partitioning the complex hologram into respective segments of the set of segments, the hologram processor component can convert the respective segments of the complex hologram to respective phase hologram segments concurrently (e.g., in parallel), as the LERDR process can be decomposed into individual threads (e.g., associated with respective hologram segments) that can be handled concurrently by the hologram processor component. In some implementations, the hologram processor component can utilize a parallel computing component(s) or architecture, such as, for example, a GPU or FPGA, to facilitate concurrently performing the conversion (e.g., concurrently performing computations that facilitate conversion) of the hologram segments to phase hologram segments. Such parallel processing by the hologram processor component can facilitate significantly speeding up the conversion of a complex hologram to a phase hologram, as compared to conventional techniques for converting a complex hologram to a phase hologram. This can enable the hologram processor component to perform the hologram conversion process (e.g., complex-hologram-to-phase-hologram conversion process) at a relatively high speed even for larger sized holograms (e.g., holograms that are 4,000×4,000 pixels in size or larger), whether black-and-white holograms or color holograms. Also, the hologram processor component can generate or compute the phase hologram (e.g., LERDR hologram), as part of the conversion of the complex hologram to the phase hologram, without requiring the presence of the original object scene during the generation or computation of the phase hologram.

A display device (e.g., a single display device), such as an SLM or an LCoS display device can be used to facilitate displaying 3-D holographic images (e.g., full-parallax 3-D holographic images) that can be reconstructed using the phase hologram (e.g., the LERD hologram). In some implementations, the display device can be a phase-only or phase-specific display device (e.g., phase-only SLM display device or phase-only LCoS display device). With regard to an LERDR hologram, the reconstructed holographic images from the LERDR hologram can exhibit a desirably high fidelity as compared with reconstructed holographic images obtained using the original complex hologram. For instance, the reconstructed holographic images can be free or at least substantially free from zero-order diffraction, twin images, or other problems associated with conventional methods or techniques. Further, in contrast to conventional methods or techniques, no further processing (e.g., no further hologram generation processing, such as, for example, quantization or other type of hologram generation processing) is necessary after the hologram is generated, as the recorded 3-D holographic image can be reconstructed by illuminating the phase hologram (e.g., POH, phase-specific hologram, or pure phase hologram) via a display device using a coherent beam of light. In other implementations, the phase hologram also can be displayed using a static media (e.g., a single static media), such as a photographic film or a printout, comprising information relating to the phase hologram.

Turning to FIG. 1, illustrated is a block diagram of an example system 100 that can efficiently and quickly (e.g., in real time or at least near real time) convert a complex 3-D hologram(s) (e.g., a complex full-parallax 3-D Fresnel hologram(s)) of a real or synthetic 3-D object scene(s) to a phase hologram(s), and display 3-D holographic images, based at least in part on the phase hologram(s), on a display component (e.g., a phase-only or phase-specific display component), in accordance with various aspects and embodiments of the disclosed subject matter. In an aspect, the system 100 can include a holographic generator component (HGC) 102 that can desirably generate a complex hologram (e.g., a complex hologram of a sequence of 3-D holographic images) that can represent a 3-D object scene (e.g., real or computer-synthesized 3-D object scene) from multiple different viewing perspectives that can correspond to multiple different viewing perspectives of the original 3-D object scene. A complex hologram (e.g., a complex amplitude hologram) is a hologram that can comprise a magnitude component or portion (e.g., an amplitude magnitude component or portion), which can have a magnitude value, and a phase component or portion, which can have a phase value. As more fully disclosed herein, the HGC 102 can convert the complex hologram to a phase hologram (e.g., a phase-only hologram (POH), phase-specific hologram, or pure phase hologram), wherein the phase hologram can be used to generate, reconstruct, or reproduce 3-D holographic images for display to one or more viewers, and wherein the 3-D holographic images can represent or recreate the original 3-D object scene from multiple visual perspectives.

In some embodiments, the HGC 102 and/or other components (e.g., display component 104) of the system 100 can be part of a multiple-view aerial holographic projection system (MVAHPS) that can generate and display a 3-D holographic image(s) of a 3-D real or synthetic, static or animated, object scene viewable from multiple perspectives (e.g., multiple angles in relation to the 3-D object scene), wherein the 3-D holographic image(s) can be viewed, for example, as a 3-D image(s) floating in mid-air in a desired display area (e.g., 3-D chamber) associated with the display component 104. The HGC 102 and display component 104 (e.g., a SLM or LCoS display device, which can be a phase-only or phase-specific display device) can facilitate generating and displaying holograms (e.g., phase holograms) at video rate in real time or near real time (e.g., facilitate generating a complex hologram, converting the complex hologram to a phase hologram, and displaying, for example, 2048×2048-pixel holographic images (or larger-sized hologram), each of which can represent 4 million object points (or more), at approximately 40 frames per second or faster, in real time or near real time).

The HGC 102 can receive (e.g., obtain) a real 3-D object scene (e.g., captured 3-D object scene), or can generate or receive a synthetic 3-D object scene (e.g., computer generated 3-D object scene). In some implementations, the HGC 102 can generate or receive a computer generated 3-D object scene that can be realized (e.g., generated) using numerical means without the presence of a physical or real-world 3-D object scene. Based at least in part on the real or synthetic 3-D object scene, the HGC 102 can generate holograms, wherein the generated holograms (e.g., full-parallax 3-D Fresnel holographic images) can represent or recreate the original 3-D object scene from multiple visual perspectives (e.g., multiple viewing angles).

In some implementations, the HGC 102 can generate model data that can represent the 3-D object scene from a desired number of viewing perspectives, based at least in part on received or generated information regarding the original 3-D object scene from multiple visual perspectives. The HGC 102 also can convert the model data to generate digital holographic data for the 3-D hologram that can be used to facilitate generating and displaying 3-D holographic images that can represent or recreate the original 3-D object scene from multiple visual perspectives.

The HGC 102 can employ any of a variety of techniques or processes to facilitate generating complex 3-D holograms of a 3-D object scene at video rate (e.g., approximately 30 frames per second) or faster in real or near real time. For instance, in some implementations, the HGC 102 can generate holograms, such as digital mask programmable holograms (DMPHs) that can be complex holograms that can be different from the classical digital Fresnel holograms. A DMPH can mimic a high-resolution hologram, but also can be displayed using display devices that can have considerably lower resolution. The HGC 102 can produce a DMPH by the superposition of two images. For instance, the HGC 102 can produce a DMPH that can comprise a static, high-resolution grating (e.g., a static high-resolution image) and a lower-resolution mask (e.g., a lower-resolution image), wherein the lower-resolution mask can be overlaid onto or superpositioned with the high-resolution grating. The HGC 102 can generate a DMPH such that the reconstructed holographic image of the DMPH can be programmed to approximate a target image (e.g., planar target image), including both intensity and depth information, by configuring the pattern of the mask. Employing such fast hologram techniques relating to DMPHs, the HGC 102 can facilitate generating complex holograms at video rate in real or near real time (e.g., facilitate generating and displaying, for example, a 2048×2048-pixel hologram, which can represent 4 million object points, at 40 frames per second or faster in real or near real time).

In certain implementations, the HGC 102 can facilitate quickly generating (e.g., at video rate of faster) complex holograms in part, for example, by downsampling information representing an object scene by a defined factor, generating an intermediate object wavefront recording plane (WRP) or an interpolative wavefront recording plane (IWRP) for a 3-D image of a 3-D object scene and/or using a look-up table(s) to store wavefront patterns of square regions of the 3-D image, and further processing (e.g., expanding, interpolating, etc.) the WRP or IWRP to facilitate generating holographic images that can represent the original object scene. Employing such fast hologram generation techniques or processes, the HGC 102 can facilitate generating a complex hologram (e.g., a 2048×2048-pixel complex hologram, which can represent 4 million object points) at 40 frames per second or better. The HGC 102 can efficiently generate complex full-parallax 3-D Fresnel holograms that can represent less than 4 million object points, 4 million object points, or more than 4 million object points, at less than 40 frames per second, 40 frames per second, or more than 40 frames per second. The fast hologram generation techniques or processes, as disclosed herein, are merely a few of a number of fast hologram generation techniques or processes that can be employed to facilitate generating a complex hologram (e.g., a 2048×2048-pixel hologram, which can represent 4 million object points) at 40 frames per second or faster in real or near real time.

To facilitate efficiently, generating, converting, and displaying phase holograms of desirable quality, the hologram processor component 106 can quickly (e.g., at video rate or a faster rate, in real-time or at least near real-time) process information represented in digital holograms to facilitate converting a complex hologram (e.g., a complex full-parallax 3-D digital Fresnel hologram) to a single phase hologram (e.g., a POH, phase-specific hologram, or pure phase hologram), and displaying 3-D holographic images representative of a 3-D object scene on a display component 104 based at least in part on the phase hologram. In accordance with various implementations, the hologram processor component 106 can convert a complex hologram to a phase hologram that can be, for example, a localized error diffusion and redistribution (LERDR) hologram, as more fully disclosed herein. In accordance with various implementations, the LERDR hologram produced by the hologram processor component 106 can represent the 3-D object scene and preserve favorable visual quality of the reconstructed holographic image of the 3-D object scene as compared to the visual quality of a reconstructed holographic image resulting from an original complex hologram. The LERDR hologram process employed by the hologram processor component 106 also can have high optical efficiency, and the LERDR hologram can be free from the problems of twin images and zero-order diffraction that can be found in holograms generated by some conventional hologram generation methods.

For clarity of explanation of the LERDR process, the bidirectional error diffusion (BERD) process and algorithm will now be briefly described. First, consider a complex Fresnel hologram with each pixel represented by $P_{u;v}$, wherein u and v can be the vertical and horizontal axes of the co-ordinate system, respectively as shown in FIG. 1(a). To convert the hologram into a POH using the BERD process, the hologram processor component 106 can process the hologram sequentially in a row by row manner. For the odd rows and even rows of the hologram, the hologram processor component 106 can scan the pixels of the odd rows from the left-to-right direction, and can scan the pixels of the even rows from the right-to-left direction. The hologram processor component 106 can convert the value (e.g., complex value) of the pixel under evaluation (e.g., being scanned and processed) to a phase-only quantity $H_p(u,v)$ by modifying the magnitude value of the pixel to a "1" or transparent value (e.g., to make the pixel a transparent pixel which can only change the phase angle of the light passing through it), for example, in accordance with (e.g., by employing) Eq. (1), as follows:

$$|H_p(u,v)|=1, \text{ and } arg(H_p(u,v))=arg(H(u,v)). \quad (1)$$

If $P_{uj;vj}$ is the current pixel, modifying the magnitude value of such pixel to a "1" value (e.g., by the hologram processor component 106) can result in an error $E(u_j, v_j)$ that, for example, can be given by Eq. (2), as follows:

$$E(u_j,v_j)=H(u_j,v_j)-H_p(u_j,v_j). \quad (2)$$

Figure 2:
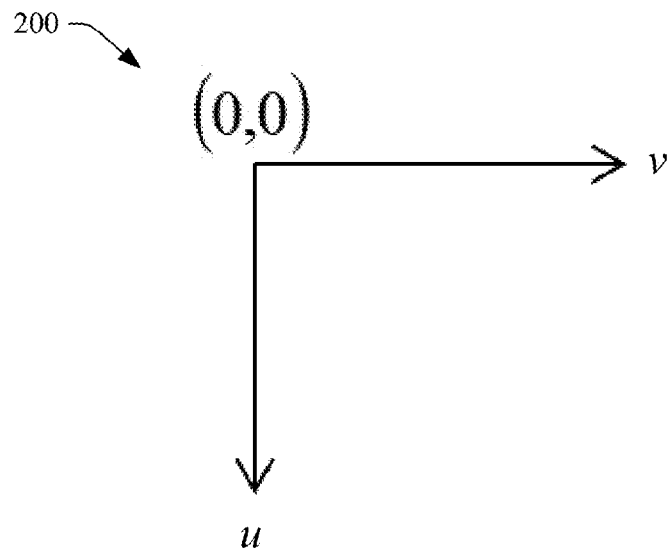
FIG. 2 depicts a diagram of an example co-ordinate system that can illustrate vertical and horizontal axes of the co-ordinate system in connection with a hologram comprising pixels.
Figure 3:
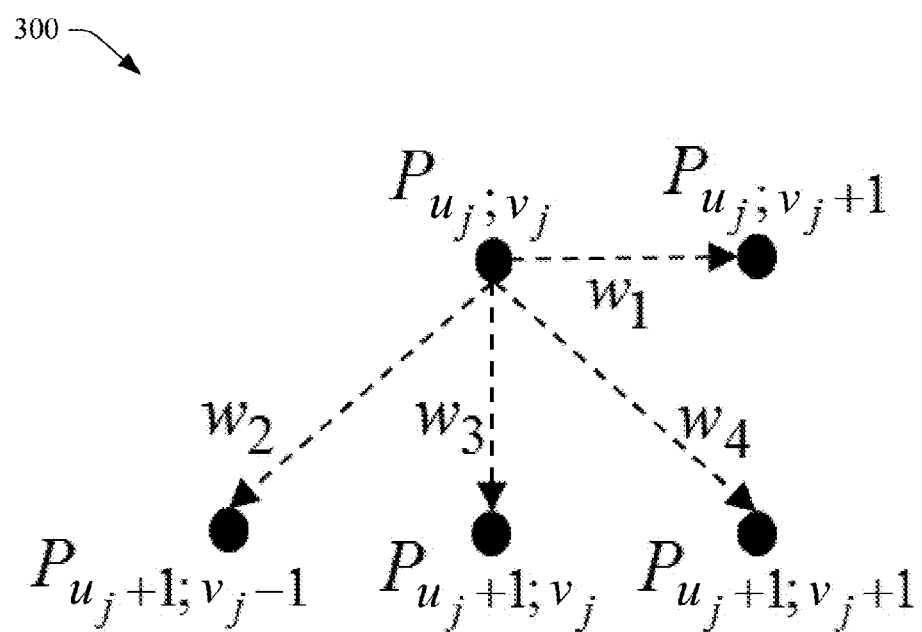
FIG. 3 illustrates a diagram of an example hologram portion that can illustrate the spatial relation between a pixel being processed and its neighbor pixels in the hologram and the diffusion of error associated with that pixel to its neighbor pixels, when the complex hologram is being scanned from left to right (e.g., for an odd row of the hologram), in accordance with various aspects and embodiments of the disclosed subject matter.
Figure 4:
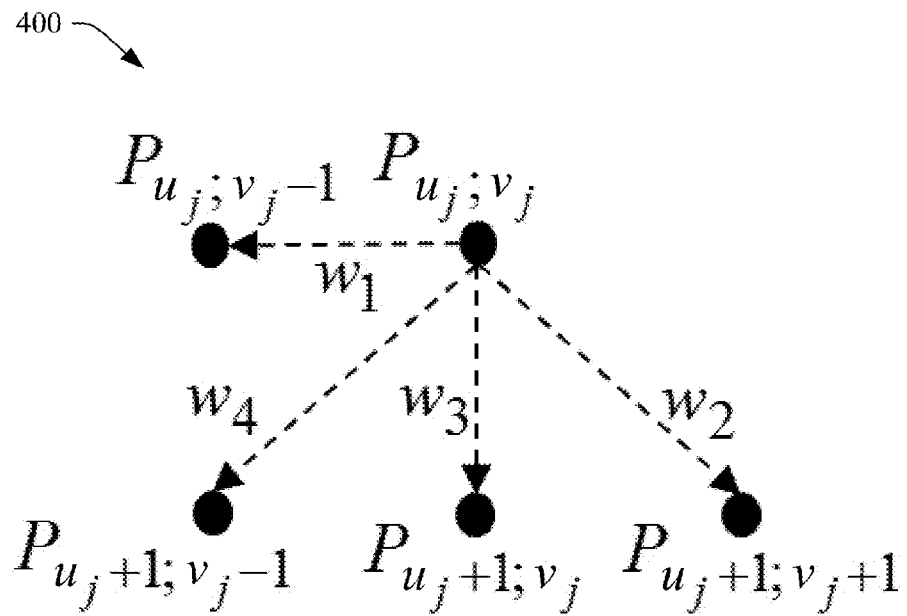
FIG. 4 presents a diagram of an example hologram portion that can illustrate the spatial relation between a pixel being processed and its neighbor pixels in the hologram and the diffusion of error associated with that pixel to its neighbor pixels, when the complex hologram is being scanned from right to left (e.g., for an even row of the hologram), in accordance with aspects and implementations of the disclosed subject matter.

The hologram processor component 106 can diffuse the error $E(u_j, v_j)$ associated with that pixel to the neighbor pixels (e.g., other pixels in proximity to the pixel being scanned and processed) that have not been visited (e.g., scanned and processed) previously by the hologram processor component 106. After the hologram processor component 106 applies Equation (2) to the pixel, the hologram processor component 106 can diffuse the error associated with the pixel to the neighbor pixels of the pixel using respective predefined weightings, wherein the neighbor pixels can be pixels that are in proximity to the pixel and have not been visited (e.g., scanned and converted) yet by the hologram processor component 106. FIG. 2 depicts a diagram of an example co-ordinate system 200 comprising a horizontal axis (v) and a vertical axis (u), in accordance with aspects and implementations of the disclosed subject matter. FIG. 3 illustrates a diagram of an example hologram portion 300 that can illustrate the spatial relation between a pixel being processed (e.g., scanned and converted to a phase-only pixel) and its neighbor pixels in the hologram and the diffusion of error associated with that pixel to its neighbor pixels, when the complex hologram is being scanned by the hologram processor component 106 from left to right (e.g., for an odd row of the hologram), in accordance with aspects and implementations of the disclosed subject matter (e.g., in accordance with the BERD process). FIG. 4 presents a diagram of an example hologram portion 400 that can illustrate the spatial relation between a pixel being processed (e.g., scanned and converted to a phase-only pixel) and its neighbor pixels in the hologram and the diffusion of error associated with that pixel to its neighbor pixels, when the complex hologram is being scanned by the hologram processor component 106 from right to left (e.g., for an even row of the hologram), in accordance with aspects and implementations of the disclosed subject matter (e.g., in accordance with the BERD process).

As can be seen in FIGS. 3 and 4, the hologram processor component 106 can facilitate diffusing the error associated with converting a complex value of a current pixel (e.g., $P_{uj;vj}$) to a phase value by employing respective weighting factors, $w_1$ to $w_4$, to respective neighbor pixels of the current pixel that have not yet been visited (e.g., scanned and converted) by the hologram processor component 106. For example, for the example hologram portion 300 of FIG. 3, the hologram processor component 106 can facilitate diffusing the error associated with the current pixel to its neighbor pixels $P_{uj;vj+1}$, $P_{uj+1;vj-1}$, $P_{uj+1;vj}$, and $P_{uj+1;vj+1}$, by employing a first weighting $w_1$ in connection with diffusing the error to neighbor pixel $P_{uj;vj+1}$, employing a second weighting $w_2$ in connection with diffusing the error to neighbor pixel $P_{uj+1;vj-1}$, employing a third weighting $w_3$ in connection with diffusing the error to neighbor pixel $P_{uj+1;vj}$, and employing a fourth weighting $w_4$ in connection with diffusing the error to neighbor pixel $P_{uj+1;vj+1}$. For the example hologram portion 400 of FIG. 4, the hologram processor component 106 can facilitate diffusing the error associated with the current pixel to its neighbor pixels $P_{uj;vj-1}$, $P_{uj+1;vj+1}$, $P_{uj+1;vj}$, and $P_{uj+1;vj-1}$, and by employing a first weighting $w_1$ in connection with diffusing the error to neighbor pixel $P_{uj;vj-1}$, employing a second weighting $w_2$ in connection with diffusing the error to neighbor pixel $P_{uj+1-1;vj+1}$, employing a third weighting $w_3$ in connection with diffusing the error to neighbor pixel $P_{uj+1;vj}$, and employing a fourth weighting $w_4$ in connection with diffusing the error to neighbor pixel $P_{uj+1;vj-1}$.

Although the BERD hologram can result in less amount of noise in the reconstructed image than conventional approaches for generating phase holograms, the conversion of each hologram pixel can involve the accumulated errors of all of the previous visited pixels in the scan path. That is, the BERD can be a recursive process that may not be suitable for parallel computation. For example, the time taken to convert a medium size 2048×2048-pixel complex hologram to a POH can be 0.72 seconds based on using a commodity personal computer. Also, the computation time can escalate monotonically with the size of the hologram. As such, the BERD technique may be less desirable for high speed operation for larger sized holograms.

The hologram processor component 106 can employ the LERDR process to convert a complex hologram to a phase hologram (e.g., POH, phase-specific hologram, or pure phase hologram) at a high rate of speed (e.g., faster than video rate for a 2048×2048-pixel hologram), for example, by processing respective portions (e.g., segments, and respective pixels therein) of the hologram in parallel, wherein the LERDR process can even quickly convert larger-sized complex holograms (e.g., holograms larger than 2048×2048 pixels) to phase holograms. Unlike some error-diffusion approaches, the LERDR process does not employ a recursive error diffusion mechanism in deriving the phase hologram from the complex hologram. In some implementations, the hologram processor component 106 can facilitate directly performing the LERDR process on the complex hologram to facilitate converting the complex hologram into the phase hologram, which can be an LERDR hologram. By directly performing the LERDR process, it is meant that, with regard to a complex hologram, the hologram processor component 106 can perform the LERDR process on the complex hologram to produce a phase hologram without having to perform additional hologram generation processing, such as, for example, quantization or other type of hologram generation processing.

As part of the LERDR process, the hologram processor component 106 can partition a complex hologram into a set of segments (e.g., segments or portions of the complex hologram), wherein each segment can comprise a subset of members (e.g., pixels) of a row of the complex hologram. The segments (e.g., hologram segments) can be contiguous and non-overlapping with each other, wherein, for example, the last member (e.g., the right-most member when the members are being scanned in a left-to-right manner) of a first segment of a row can be adjacent to and does not overlap a first member (e.g., the left-most member when the members are being scanned in a left-to-right manner) of a second segment of the row that is adjacent to the first segment.

For all or desired members (e.g., pixels) of each segment of a complex hologram, the hologram processor component 106 can scan, analyze, or examine the respective members of the respective segments of the complex hologram. For instance, the hologram processor component 106 can scan, analyze, or examine the members of the complex hologram in a segment by segment manner (e.g., scanning members in a first segment, scanning members in a second segment, and so on), and a row by row manner (e.g., scanning members in a first row, scanning members in a second row, and so on), for example, in a left to right manner (e.g., by scanning a member in a segment in a row, scanning a next member that is to the right of the member in the segment, or a next segment, in the row, and so on).

For each member of a hologram segment that is being visited or scanned, the hologram processor component 106 can convert the complex value (e.g., magnitude and phase values) of the member to a phase value (e.g., a phase-only or phase-specific value). For instance, the hologram processor component 106 can set or modify (or remove) the magnitude value of the member to a defined constant magnitude value (e.g., a value of unity or other defined value that can represent a transparent member), while maintaining the phase value of the member at its original value (e.g., keeping the phase value exactly as it is in the complex hologram), to facilitate converting the complex value of the member to a phase value.

Converting a complex value of a member of a complex hologram to a phase value can result in an error, if no other processing is performed. To facilitate compensating or reducing the effect of this error, the hologram processor component 106 can apply or perform a desired diffusion process or technique to facilitate diffusing the error associated with a member to certain (e.g., not previously visited) neighbor members in proximity to (e.g., next to) the member in the hologram. In some implementations, the hologram processor component 106 can apply or perform an LERDR process to the complex hologram, and members therein, to facilitate diffusing an error associated with the visited member (e.g., a scanned and converted member) to certain (e.g., not previously visited) neighbor members in proximity to (e.g., next to) the visited member in the hologram.

In other implementations, the hologram processor component 106 alternatively can perform or apply a BERD process or unidirectional error diffusion (UERD) process to the complex hologram, and members therein, to facilitate diffusing an error associated with the visited member (e.g., a scanned and converted member) to certain (e.g., not previously visited) neighbor members in proximity to (e.g., next to) the visited member in the hologram, as described herein. Briefly with regard to the UERD process, the UERD process can be similar to the BERD process, as described herein, in that members of a complex hologram can be scanned and converted in a row by row manner, however, unlike, the BERD process, the UERD process involves the hologram processor component 106 scanning the members in each row of the hologram in the same direction (e.g., left-to-right direction, or right-to-left direction). As part of the UERD process, the hologram processor component 106 can diffuse the error associated a visited (e.g., scanned and converted) member to a subset of neighbor members in proximity to the visited pixel. A UERD hologram can be used to reconstruct images that can have relatively good quality as compared to the reconstructed images derived from the original complex hologram. Also, the reconstructed images derived from the UERD hologram can contain less amount of noise than the reconstructed images derived using certain conventional approaches for generating phase holograms, although, with the UERD process, the conversion of each hologram member can involve the accumulated errors of all of the previous visited members in the scan path, and, as a result, the quality of reconstructed images for UERD holograms is generally not as good as the quality of reconstructed images that can be generated using BERD holograms or the quality of reconstructed images that can be generated using LERDR holograms.

With further regard to the LERDR process, when the hologram processor component 106 is scanning members of a complex hologram (e.g., as partitioned into respective segments) from left to right in a row (e.g., in respective segments in the row) and scanning the rows from top row to bottom row in the hologram, a member $P_{uj;vj}$ of a hologram segment can be located at $u_j$, $v_j$ in the segment in the hologram, wherein that member is not the last pixel in the segment. The hologram processor component 106 can convert the complex value of that member $P_{uj;vj}$ to a phase value. As part of the LERDR process, the hologram processor component 106 can apply or perform error diffusion to facilitate diffusing the error associated with converting the complex value of the member to a phase value to a subset of neighbor members in proximity to the visited (e.g., scanned and converted) member $P_{uj;vj}$, wherein those neighbor members in the subset of neighbor members have not been visited (e.g., not been scanned and converted) yet by the hologram processor component 106.

For example, the hologram processor component 106 can diffuse the error associated with the member to or on a first neighbor member (e.g., $P_{uj;vj+1}$) to the right of the member in the segment (e.g., located at $u_j$, $v_j+1$ in the hologram segment), a second neighbor member (e.g., $P_{uj+1;vj-1}$) in the next row down and one space (e.g., pixel space) back (e.g., to the left) in that next row (e.g., located at $u_j+1,v_j-1$ in the hologram), a third neighbor member (e.g., $P_{uj+1;vj+1}$) in the next row down directly below the member (e.g., located at $u_j+1$, $v_j$ in the hologram), and a fourth neighbor member (e.g., $P_{uj+1;vj+1}$) in the next row down and one space to the right of the member (e.g., located at $u_j+1$, $v_j+1$ in the hologram). As part of the diffusion process or technique (e.g., LERDR process or technique), the hologram processor component 106 can update the respective complex values (e.g., complex quantities) of the respective neighbor members of the subset of neighbor members by respective defined error-based values to generate respective new or updated complex values for those respective certain neighbor members based at least in part on the error associated with the member due to the conversion and respective defined constant coefficients (e.g., respective defined weighting values) applicable to the respective neighbor members of the subset of neighbor members, as more fully disclosed herein.

As further example, as part of the LERDR process, when the visited member $P_{uj;vj}$ is the last member in the hologram segment, the hologram processor component 106 can diffuse the error associated with the member to or on a first neighbor member (e.g., $P_{uj+1;v-1}$) in the next row down and one space (e.g., pixel space) back (e.g., to the left) in that next row (e.g., located at $u_j+1,v_j-1$ in the hologram), a second neighbor member (e.g., $P_{uj+1;v}$) in the next row down directly below the member (e.g., located at $u_j+1$, $v_j$ in the hologram), and a third neighbor member (e.g., $P_{uj+1;vj+1}$) in the next row down and one space to the right of the member (e.g., located at $u_j+1$, $v_j+1$ in the hologram). Note that, since the visited member $P_{uj;vj}$ here is the last member of the segment, and the neighbor member (e.g., $P_{uj;vj+1}$), which is located to the right of the visited member at $u_j$, $v_j+1$ in the row of the hologram, is part of a next segment. As part of the diffusion process or technique (e.g., LERDR process or technique), the hologram processor component 106 can update the respective complex values (e.g., complex quantities) of the respective neighbor members of the subset of neighbor members by respective defined error-based values to generate respective new or updated complex values for those respective certain neighbor members based at least in part on the error associated with the member (e.g., the last member of the segment) due to the conversion and respective defined constant coefficients (e.g., respective defined weighting values) applicable to the respective neighbor members of the subset of neighbor members, as more fully disclosed herein. In some implementations, the respective defined constant coefficients employed by the hologram processor component 106 in connection with diffusing the error associated with the last member of a segment can be different than defined constant coefficients employed by the hologram processor component 106 in connection with diffusing the error associated with a member of the segment that is not the last member of the segment.

With respect to the error associated with the last member of each hologram segment, the hologram processor component 106 also can apply error redistribution to the phase hologram to produce the resulting LERDR hologram. For instance, the hologram processor component 106 can apply error distribution to each segment of the phase hologram to facilitate redistributing the error associated with the last pixel of each segment, so that the error associated with the last pixel in each segment can be diffused to another segment adjacent to such segment in the row of the hologram. In some implementations, the hologram processor component 106 can apply low-pass filtering to each hologram segment (e.g., to the error signal associated with the last pixel of the segment) to facilitate redistributing the error associated with the last pixel of each hologram segment.

The hologram processor component 106 can continue to perform this LERDR process for all or a desired portion of the members of segments of the complex hologram to convert the respective complex values of the members to respective phase values, and to diffuse error associated with a given member after its conversion to certain (e.g., not previously visited) neighbor members in proximity to that member to generate respective updated complex values for those certain neighbor members. By performing this LERDR process, the hologram processor component 106 can convert the complex hologram to a phase hologram, which can be an LERDR hologram.

With the hologram processor component 106 partitioning the complex hologram into respective segments of the set of segments, the hologram processor component 106 can convert the respective segments (respective pixels in the respective segments) of the complex hologram to respective phase hologram segments concurrently (e.g., in parallel), as the LERDR process can be decomposed into individual threads (e.g., associated with respective hologram segments) that can be handled concurrently by the hologram processor component 106. In some implementations, the hologram processor component 106 can utilize a parallel computing component(s) (not shown in FIG. 1) or architecture, such as, for example, a GPU or FPGA, to facilitate concurrently performing the conversion (e.g., concurrently performing computations that facilitate conversion) of the hologram segments to phase hologram segments, including performing error diffusion and/or error redistribution to diffuse and/or redistribute respective errors associated with converting respective complex values of members of segments to respective phase values. Such parallel processing by the hologram processor component 106 can facilitate significantly speeding up the conversion of a complex hologram to a phase hologram (e.g., LERDR hologram), as compared to conventional techniques for converting a complex hologram to a phase hologram. This can enable the hologram processor component 106 to perform the hologram conversion process (e.g., complex-hologram-to-phase-hologram conversion process) at a relatively high speed even for larger sized holograms (e.g., holograms that are 4,000×4,000 pixels in size or larger), whether black-and-white holograms or color holograms. Also, the hologram processor component 106 can generate or compute the phase hologram (e.g., LERDR hologram), as part of the conversion of the complex hologram to the phase hologram, without requiring the presence of the original object scene during the generation or computation of the phase hologram.

The HGC 102 and/or display component 104 can facilitate generating a reconstructed holographic image(s) based at least in part on the phase hologram resulting from the LERDR process. For instance, the HGC 102 and/or display component 104 can facilitate applying a coherent optical beam to the phase hologram to facilitate generating a reconstructed holographic image(s) that can represent the 3-D object scene associated with the original complex hologram.

As illustrated in the disclosed subject matter, the reconstructed holographic image(s), generated based at least in part on the phase hologram derived from the LERDR process, can have a favorable visual quality (e.g., a desirably high fidelity) that can be of substantially similar visual quality as compared to the visual quality of a reconstructed holographic image(s) that can be obtained using the original complex hologram. For instance, the reconstructed holographic images can be free or at least substantially free from zero-order diffraction, twin images, or other problems associated with certain conventional methods or techniques for hologram generation and display. Further, in contrast to conventional methods or techniques, no further processing (e.g., no additional hologram generation processing, such as, for example, quantization or other type of hologram generation processing) is necessary after the hologram is generated, as the recorded 3-D holographic image can be reconstructed by illuminating the phase hologram (e.g., POH, phase-specific, or pure phase hologram) via a display device (e.g., phase-only SLM display device) with a coherent beam of light.

With further regard to the display component 104, the display component 104 can be electronically accessible. The HGC 102 can be associated with (e.g., communicatively connected to) the display component 104 and can provide (e.g., communicate) the 3-D hologram (e.g., the 3-D phase hologram) to the display component 104, for example, at video rate or a faster rate in real or near real time. In some implementations, the 3-D phase hologram can be on recorded media (e.g., 2-D media, such as film), and the HGC 102 can provide the 3-D phase hologram via the recorded media, as disclosed herein.

The display component 104 can facilitate generating, reconstructing, reproducing, or presenting 3-D holographic images (e.g., full-parallax 3-D Fresnel holographic images) that can represent or recreate the original 3-D object scene, based at least in part on the phase hologram, and can present (e.g., display) the 3-D holographic images for viewing by one or more viewers from various visual perspectives of the original 3-D object scene. In some implementations, the HGC 102 and the display component 104 can operate in conjunction with each other to facilitate generating, reconstructing, reproducing, or presenting the 3-D holographic images that can represent or recreate the original 3-D object scene, based at least in part on the phase hologram, for presentation, by the display component 104. The display component 104 can be or can comprise a display device(s), such as an SLM display device or an LCoS display device that can be used to facilitate displaying 3-D holographic images (e.g., full-parallax 3-D holographic images) that can be reconstructed using the phase hologram. In some implementations, the display component 104 can be or can comprise a phase-only or phase-specific display device(s) (e.g., phase-only SLM display device).

In some implementations, the display component 104 can include one or more display units (e.g., one or more electronically accessible display units, wherein each pixel of a display unit(s) can be electronically accessible), wherein each display unit can be a phase-only display device, such as a phase-only SLM display device or a phase-only LCoS display device. In other implementations, the display component 104 can comprise one or more of high-resolution LCDs, autostereoscopic display devices (e.g., multiple-section autostereoscopic displays (MSADs)), holographic 3-D television (TV) displays, high-resolution LCoS display devices, high-resolution SLM display devices, or other desired display devices suitable for displaying holographic images (e.g., 3-D Fresnel holographic images produced from phase holograms), to facilitate displaying (e.g., real time displaying) of holographic images.

Additionally and/or alternatively, if desired, a hologram can be produced (e.g., by the HGC 102 or another component) onto a desired material (e.g., onto film using photographic techniques) so that there can be a hard copy of the hologram that can be used to reproduce the 3-D holographic images at a desired time. In some implementations, the HGC 102 can generate the digital hologram (e.g., the 3-D phase hologram) using a single static media, such as a photographic film or a printout, comprising information relating to the digital hologram. The display component 104 can display holographic images that can be reconstructed based at least in part on the digital hologram of the static media.

It is to be appreciated and understood that the holographic output (e.g., 3-D hologram and/or corresponding 3-D holographic images) can be communicated over wired or wireless communication channels to the display component 104 or other display components (e.g., remote display components, such as a 3-D TV display) to facilitate generation (e.g., reconstruction, reproduction) and display of the 3-D holographic images of the 3-D object scene) so that the 3-D holographic images can be presented to desired observers.

The system 100 and/or other systems, methods, devices, processes, techniques, etc., of the disclosed subject matter can be employed in any of a number of different applications. Such applications can include, for example, a 3-D holographic video system, desktop ornaments, attractions in theme parks, live stage or concerts, other entertainment-related applications or purposes, educational applications or purposes, a holographic studio, scientific research, other professional applications or purposes, encryption, watermarking, etc.

Further aspects and embodiments of the disclosed subject matter are described herein with regard to FIG. 1 and the other figures disclosed herein. There can be a complex full-parallax 3-D Fresnel hologram that can be generated (e.g., by the HGC 102) from object waves emitted from each point on a 3-D object scene (e.g., a real or synthesized 3-D object scene). Each pixel in the complex hologram can be denoted by $P_{u,v}$ and can have a value $H(u,v)$, wherein u and v are the vertical and horizontal axes of the co-ordinate system 200, respectively, as shown in FIG. 2, for example, as given by Equation (3) as follows:

$$H(u, v)|_{\substack{0 \le u < U \\ 0 \le v < V}} = \sum_{x=0}^{U-1} \sum_{y=0}^{V-1} \frac{I(x, y)\exp(i2\pi r_{x;y;u;v}/\lambda)}{r_{x;y;u;v}}, \quad (3)$$

wherein $I(x,y)$ and $r_{x;y;u;v} = [(u-x)^2\delta + (v-y)^2\delta + w_{x,y}^2]^{0.5}$ are the intensity of the point located at (x,y) in the 3-D scene and its distance to the hologram, respectively. The perpendicular distance of a point at position (x,y) to the hologram can be denoted by $w_{x,y}$. $\lambda$ can be the wavelength of the optical beam, and $\delta$ can be the pixel size of the hologram. U and V can be the number of rows and columns of the hologram, respectively, and can be assumed to be the same as (e.g., can correspond to) the 3-D object scene. The complex hologram can be converted into a POH, $H_p(u,v)$, by setting the magnitude of each pixel to be transparent with a value of unity, which can remove the magnitude information, for example, as given by Equation (1):

$$|H_p(u,v)|=1|, \text{ and } arg(H_p(u,v))=arg(H(u,v)). \tag{1}$$

However, as disclosed herein, the quality of the reconstructed image of a POH generated merely by using Equation (1) can be extremely poor (e.g., can have heavy distortion). It is apparent that the heavy distortion on the reconstructed image can be caused by the large amount of error in each hologram pixel that can result after removing the magnitude information.

To facilitate overcoming this problem (e.g., the problem of heavy distortion), the hologram processor component 106 can employ one or more types of error diffusion processes (e.g., LERDR, BERD, or UERD processes) or techniques that can facilitate compensating the error of each hologram pixel. The BERD process and UERD process have already been described herein.

Figure 5:
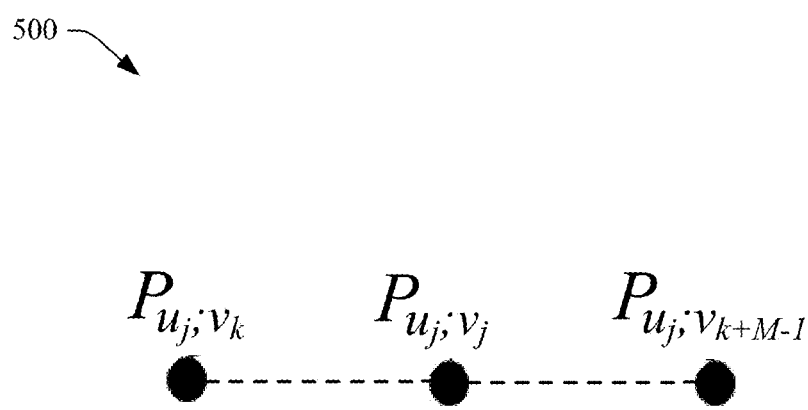
FIG. 5 depicts a diagram of an example hologram segment comprising a subset of pixels, in accordance with various aspects and implementations of the disclosed subject matter.

The LERDR process can be outlined as follows. The LERDR process can be a multi-stage process, comprising, for example, a localized error diffusion (LERD) process and an error redistribution process. In the first stage (e.g., the LERD process stage), the hologram processor component 106 can process a complex hologram (e.g., a complex full-parallax 3-D Fresnel hologram) sequentially in a row by row manner. Referring briefly to FIG. 5 (along with FIG. 1, along each row of the hologram, the hologram processor component 106 can partition (e.g., uniformly partition) the hologram pixels into contiguous, non-overlapping segments of M pixels each, for example, as depicted in FIG. 5, which is a diagram of an example hologram segment 500 comprising M pixels (e.g., M members), in accordance with various aspects and implementations of the disclosed subject matter. A hologram segment 500 of the hologram can comprise, for example, a first pixel (e.g., $P_{uj;vk}$), one or more other pixels (e.g., $P_{uj;vj}$) in the middle of the segment 500, and a last pixel (e.g., $P_{uj;vk+M-1}$).

In each segment, the hologram processor component 106 can scan the pixels (e.g., complex pixels) of the segment (e.g., 500) from left to right (or, alternatively, from right to left) beginning with the first pixel of the segment and ending with the last pixel of the segment. For example, with pixel $P_{uj;vk}$ being the pixel of a segment that is being processed by the hologram processor component 106, the next pixel of the segment to be scanned and processed can be $P_{uj;vk+1}$, followed by $P_{uj;vk+2}$, and so on, until all of the pixels in the segment in row $u_j$ of pixels has been scanned and processed. The hologram processor component 106 can proceed to scan and process the pixels of the next segment (if any segments remain in that row, and, after hologram processor component 106 has finished processing the pixels in that row, the hologram processor component 106 can proceed to scan and process pixels in respective segments of the next row $u_j+1$ (if any rows remain) in a left to right manner.

The hologram processor component 106 can convert each visited (e.g., scanned) pixel (e.g., convert a complex value of the pixel) of a segment into a phase-only quantity (e.g., value) $H_p(u_j,v_j)$, in accordance with (e.g., using) Equation (1). Given that $P_{uj;vk}$ can be the current pixel that is being processed by the hologram processor component 106, setting the magnitude of the pixel to unity can result in an error associated with that current pixel, wherein the error can be given, for example, by Equation (2):

$$E(u_j,v_j)=H(u_j,v_j)-H_p(u_j,v_j). \tag{2}$$

Figure 6:
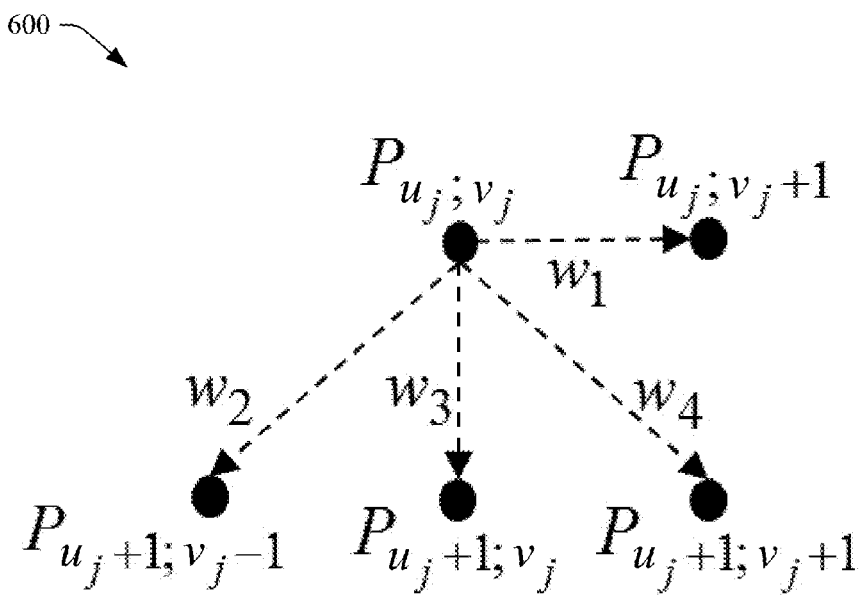
FIG. 6 presents a diagram of an example hologram portion that can illustrate the spatial relation between a visited pixel in a hologram segment (when the pixel is not the last pixel in the segment) and its neighbor pixels for compensation of the error via localized error diffusion, in accordance with various aspects and embodiments of the disclosed subject matter.

The hologram processor component 106 can facilitate diffusing the error $E(u_j, v_j)$ of a current pixel to the neighbor pixels (e.g., pixels that neighbor the current pixel) that have not been visited previously by the hologram processor component 106 while scanning the complex hologram. Referring briefly to FIG. 6 (along with FIG. 1), FIG. 6 presents a diagram of an example hologram portion 600 that can illustrate the spatial relation between pixel $P_{uj;vk}$ of the first M−1 pixels in a hologram segment (e.g., 500) (when the pixel is not the last pixel in the segment) and its neighbor pixels for compensation of the error via diffusion (e.g., localized error diffusion) using the LERDR process, in accordance with various aspects and embodiments of the disclosed subject matter. As depicted in the example hologram portion 600, for each of the first M−1 pixels of a hologram segment, the hologram processor component 106 can diffuse the error associated with the pixel (e.g., $P_{uj;vj}$) to a subset of neighbor pixels in proximity to the pixel (e.g., $P_{uj;vj}$), wherein the subset of neighbor pixels can comprise, for example, a neighbor pixel (e.g., $P_{uj;vj+1}$) adjacent to the pixel in the row (e.g., the neighbor pixel to the right of the pixel in the row) and the three neighbor pixels (e.g., $P_{uj+1;vj-1}$, $P_{uj+1;vj}$, and $P_{uj+1;vj+1}$) that are in an adjacent row (e.g., row $u_j+1$) and neighbor (e.g., are adjacent or in proximity to) the pixel in the hologram (e.g., the three pixels that are beneath and in proximity to the pixel, as shown in FIG. 6).

Figure 7:
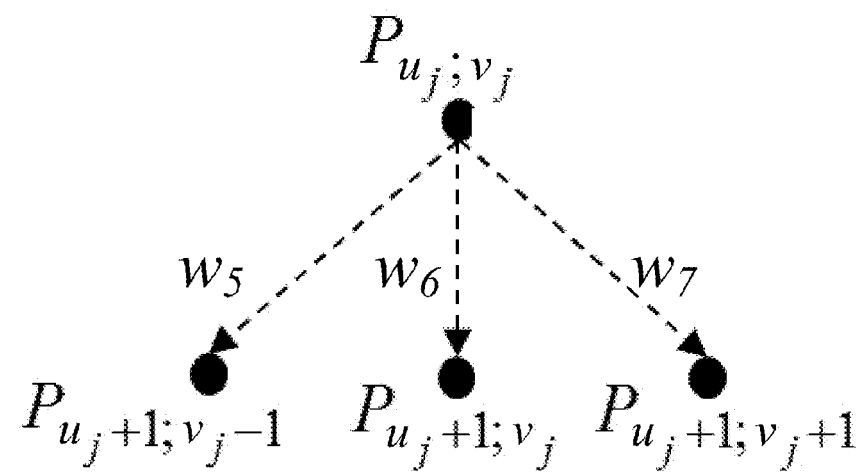
FIG. 7 depicts a diagram of an example hologram portion that can illustrate the spatial relation between a visited pixel in the hologram segment (when the pixel is the last pixel in the segment) and its neighbor pixels for compensation of the error via localized error diffusion, in accordance with various aspects and embodiments of the disclosed subject matter.

Referring briefly to FIG. 7 (along with FIG. 1), FIG. 7 depicts a diagram of an example hologram portion 700 that can illustrate the spatial relation between pixel $P_{uj;vk}$ in the hologram segment (e.g., 500) (when the pixel is the last pixel in the segment) and its neighbor pixels for compensation of the error via diffusion (e.g., localized error diffusion) using the LERDR process, in accordance with various aspects and embodiments of the disclosed subject matter. As depicted in the hologram portion 700, for the last pixel in the hologram segment, the error associated with the last pixel (e.g., $P_{uj;vj}$) can be diffused (e.g., is only diffused) to the three pixels (e.g., $P_{uj+1;v-1}$, $P_{uj+1;vj}$, and $P_{uj+1;vj+1}$) that are in an adjacent row (e.g., row $u_j+1$) and neighbor (e.g., are adjacent or in proximity to) the last pixel in the hologram (e.g., the three pixels that are beneath and in proximity to the last pixel, as shown in FIG. 7).

To facilitate diffusing the error to the neighbor pixels in proximity to the current pixel, when the current pixel is not the last pixel in the segment, the hologram processor component 106 can facilitate updating the neighbor members in proximity to the current pixel, in accordance with (e.g., by applying or performing calculations according to) Equations (4), (5), (6), and (7), and when the current pixel is the last pixel in the segment, the hologram processor component 106 can facilitate updating the neighbor members in proximity to the last pixel, in accordance with (e.g., by applying or performing calculations according to) Equations (8), (9), and (10), as follows:

$$H(u_j,v_j+1) \leftarrow H(u_j,v_j+1)+w_1E(u_j,v_j), \tag{4}$$

$$H(u_j+1,v_j+1) \leftarrow H(u_j+1,v_j-1)+w_2E(u_j,v_j), \tag{5}$$

$$H(u_j+1,v_j) \leftarrow H(u_j+1,v_j)+w_3E(u_j,v_j), \tag{6}$$

$$H(u_j+1,v_j+1) \leftarrow H(u_j+1,v_j+1)+w_4E(u_j,v_j), \tag{7}$$

$$H(u_j+1,v_j-1) \leftarrow H(u_j+1,v_j-1)+w_5E(u_j,v_j), \tag{8}$$

$$H(u_j+1,v_j) \leftarrow H(u_j+1,v_j) + w_6 E(u_j,v_j), \quad (9)$$

$$H(u_j+1,v_j+1) \leftarrow H(u_j+1,v_j+1) + w_7 E(u_j,v_j), \quad (10)$$

wherein the operator "←" denotes updating the variable on the left hand side (e.g., to the left of the operator "←") of the expression in an equation with the variable on the right hand side (e.g., to the right of the operator "←") of the expression, and wherein the hologram processor component 106 can set the respective values of the constant coefficients $w_1$, $w_2$, $w_3$, $w_4$, $w_5$, $w_6$, and $w_7$ to respective defined values, such as, for example, $w_1=7/16$, $w_2=3/16$, $w_3=5/16$, $w_4=1/9$, $w_5=3/9$, $w_6=5/9$, and $w_7=1/9$. As can be observed in FIGS. 6 and 7, the distribution of error from each pixel can always be localized within its own segment, and not propagated to another segment of the hologram. As such, the hologram processor component 106 can perform the error diffusion process of the segments of the complex hologram in a parallel fashion.

For example, referring again briefly to FIG. 6 (along with FIG. 1), in accordance with the LERDR process, the hologram processor component 106 can visit (e.g., scan) and process (e.g., convert to a phase-only value) $P_{uj;vj}$. The hologram processor component 106 also can update the complex value of $P_{uj;vj+1}$ (e.g., an unvisited neighbor pixel) to generate an updated complex value for that neighbor pixel to facilitate diffusing the error $E(u_j, v_j)$ associated with the pixel $P_{uj;vj}$, based at least in part on the error associated with processing the pixel and the applicable coefficient $w_1$, for example, in accordance with (e.g., by performing calculations or modifying values based at least in part on) Equation (4); can update the complex value of $P_{uj+1;vj-1}$ (e.g., an unvisited neighbor pixel) to generate an updated complex value for that neighbor pixel to facilitate diffusing the error $E(u_j, v_j)$ associated with the pixel $P_{uj;vj}$, based at least in part on the error associated with processing the pixel and the applicable coefficient $w_2$, for example, in accordance with Equation (5); can update the complex value of $P_{uj+1;vj}$ (e.g., an unvisited neighbor pixel) to generate an updated complex value for that neighbor pixel to facilitate diffusing the error $E(u_j, v_j)$ associated with the pixel $P_{uj;vj}$, based at least in part on the error associated with processing the pixel and the applicable coefficient $w_3$, for example, in accordance with Equation (6); and can update the complex value of $P_{uj+1;vj+1}$ (e.g., an unvisited neighbor pixel) to generate an updated complex value for that neighbor pixel to facilitate diffusing the error $E(u_j, v_j)$ associated with the pixel $P_{uj;vj}$, based at least in part on the error associated with processing the pixel and the applicable coefficient $w_4$, for example, in accordance with Equation (7).

As further example, referring again briefly to FIG. 7 (along with FIG. 1), in accordance with the LERDR process, the hologram processor component 106 can visit (e.g., scan) and process (e.g., convert to a phase-only value) the last pixel $P_{uj;vj}$ of the hologram segment (e.g., 500). The hologram processor component 106 also can update the complex value of $P_{j+1;vj-1}$ (e.g., an unvisited neighbor pixel) to generate an updated complex value for that neighbor pixel to facilitate diffusing the error $E(u_j, v_j)$ associated with the last pixel $P_{uj;vj}$ based at least in part on the error associated with processing the pixel and the applicable coefficient $w_5$, for example, in accordance with Equation (8); can update the complex value of $P_{uj+1;vj}$ (e.g., an unvisited neighbor pixel) to generate an updated complex value for that neighbor pixel to facilitate diffusing the error $E(u_j, v_j)$ associated with the last pixel $P_{uj;vj}$, based at least in part on the error associated with processing the pixel and the applicable coefficient $w_6$, for example, in accordance with Equation (9); and can update the complex value of $P_{uj+1;vj+1}$ (e.g., an unvisited neighbor pixel) to generate an updated complex value for that neighbor pixel to facilitate diffusing the error $E(u_j, v_j)$ associated with the last pixel $P_{uj;vj}$, based at least in part on the error associated with processing the pixel and the applicable coefficient $w_7$, for example, in accordance with Equation (10).

In accordance with the disclosed LERDR process, the hologram processor component 106 can scan and process the pixels in the respective segments of the complex hologram, and can diffuse the respective errors associated with the respective pixels, to generate the resulting phase hologram, based at least in part on the processing of the first M−1 pixels in each of the segments of the complex hologram, in accordance with Equations (4) through (7), and the processing of the even rows of the complex hologram, in accordance with Equations (8) through (10). The resulting phase hologram, or portion thereof, can be referred to as an LERD hologram, or portion of an LERD hologram, as, to this point, while the LERD portion of the LERDR process has been performed, the error distribution process has yet to be performed. It is to be appreciated though that the hologram processor component 106 can perform respective portions of the LERDR process on respective portions (e.g., pixels, segments) of the hologram concurrently (e.g., in parallel). Thus, for example, the hologram processor component 106 can be performing the LERD process on a first portion (e.g., segment) of a hologram while concurrently performing an error redistribution process on another portion (e.g., a second segment) of the hologram.

It is to be appreciated and understood that, while the disclosed subject matter describes that the hologram processor component 106 can scan and process pixels in the segments in the rows of the complex hologram from left to right, in accordance with Equations (4) through (10), the disclosed subject matter is not so limited. In accordance with various other implementations, the hologram processor component 106 alternatively can scan and process pixels in the segments in the rows of the complex hologram from right to left, in accordance with Equations (4) through (10), as modified to account for the alternate direction of scanning and processing of the pixels (e.g., an alternate LERDR process); or can perform another technique or process that can scan and process pixels of the complex hologram to convert complex values of pixels of the complex hologram to phase values, can facilitate diffusing error resulting from converting the complex values of pixels to phase values to their respective neighbor pixels in the complex hologram, and can facilitate interrupting, reducing, minimizing, or counteracting correlated error that may develop during the scanning and processing of pixels in a row of the complex hologram, in accordance with the disclosed subject matter.

As disclosed herein, the reconstructed image of a phase hologram (e.g., POH) obtained with the LERD process in stage 1 can be heavily degraded. The reason for this is that the error of the last pixel in each segment of the hologram is not compensated, as in the case of the other pixels (e.g., members) of the segment, by the pixel to the right of the last pixel, wherein the pixel to the right is part of the other segment adjacent to the segment in the hologram. To facilitate alleviating this problem of degradation, the hologram processor component 106 can process or filter the phase hologram, or portion thereof, to facilitate redistributing the error signals associated with the last pixels of the respective segments in the phase hologram. In some implementations, the hologram processor component 106 can apply low-pass filtering (e.g., using a low-pass filter) to redistribute the error signal in the phase hologram, so that the error in the last pixel of each segment of the phase hologram can be diffused to its adjacent segment in the phase hologram. In the realization of the low-pass filtering, the hologram processor component 106 can convolve the phase hologram with a low-pass function, in accordance with Eq. (11), as follows:

$$H_L(u,v) = H_p(u,v) * G(u,v), \qquad (11)$$

wherein $H_L(u, v)$ is the LERDR hologram (e.g., a POH hologram) that can be obtained using the LERDR process. In some implementations, the hologram processor component 106 can realize or perform the convolution process in Equation (11) in the frequency domain using a Fast Fourier Transform, with the transfer function of $G(u, v)$ being a box function that can be given by Equation (12) as follows:

$$\overline{G}(\omega_u, \omega_v) = \begin{cases} 1 & \omega_x, \omega_y \leq s \\ 0 & \text{otherwise} \end{cases}, \qquad (12)$$

wherein $G(\omega_u, \omega_v)$ can be the Fourier Transform of $G(u,v)$, with $\omega_u$ and $\omega_v$ being the vertical and horizontal frequency axes, respectively, and s can be a variable relating to bandwidth, wherein s can be a desired value (e.g., $\pi/4$, $\pi/2$, $3\pi/4$, or other desired value) that is smaller than $\pi$. The generation of the LERD hologram and low-pass filtering to facilitate generating the LERDR hologram from the LERD hologram can be realized (e.g., performed) concurrently by the hologram processor component 106, for example, by using a GPU when performing the LERDR process.

With regard to the LERDR process, BERD process, and UERD process described herein, the respective LERDR, BERD, and UERD processes assume that all of the pixels in the phase-only display device are normal (e.g., each pixel will exhibit a phase shift that is proportional to the value applied to it). The hologram processor component 106 also can include a means to facilitate decreasing the sensitivity of the phase hologram towards dead pixels (e.g., pixels that are opaque, or transparent with no phase shift, or a constant phase shift that is independent to the value applied to the pixel). Such dead pixels commonly can be found in many display devices due to the imperfection in manufacturing, and their positions and defective values can be evaluated beforehand. Dead pixels in a phase-only display device can be classified into 3 main types. For a dead pixel that is opaque, the hologram processor component 106 can set or modify the values (e.g., complex and imaginary parts) of such dead pixel to zero. For a dead pixel that is transparent with no phase shift, the hologram processor component 106 can set or modify the real part and imaginary part of the dead pixel's value to unity (e.g., one) and zero, respectively. For a dead pixel with a constant phase shift $\phi$, the hologram processor component 106 can set or modify the values of the dead pixel's real part and imaginary part to $\cos(\phi)$ and $\sin(\phi)$, respectively.

The error that can result from a pixel value, regardless of whether it is a normal pixel or a dead pixel, can be calculated, for example, in accordance with Eq. (3). For a particular pixel of a complex hologram that is being scanned, the hologram processor component 106 can diffuse such error to the pixels (e.g., neighbor pixels) that are normal in its neighbor, via the LERDR process, BERD process, or UERD process, as described herein.

In addition, the hologram processor component 106 can increase the weighting factor by a factor C that can be greater than 1. In some implementations, by assuming or deeming that $$\sum_{k=1}^{4} w_k = 1,$$

the hologram processor component 106 (or another component) can derive the factor C from the reciprocal of the sum of weighting factors associated with the normal pixel(s).

Figure 8:
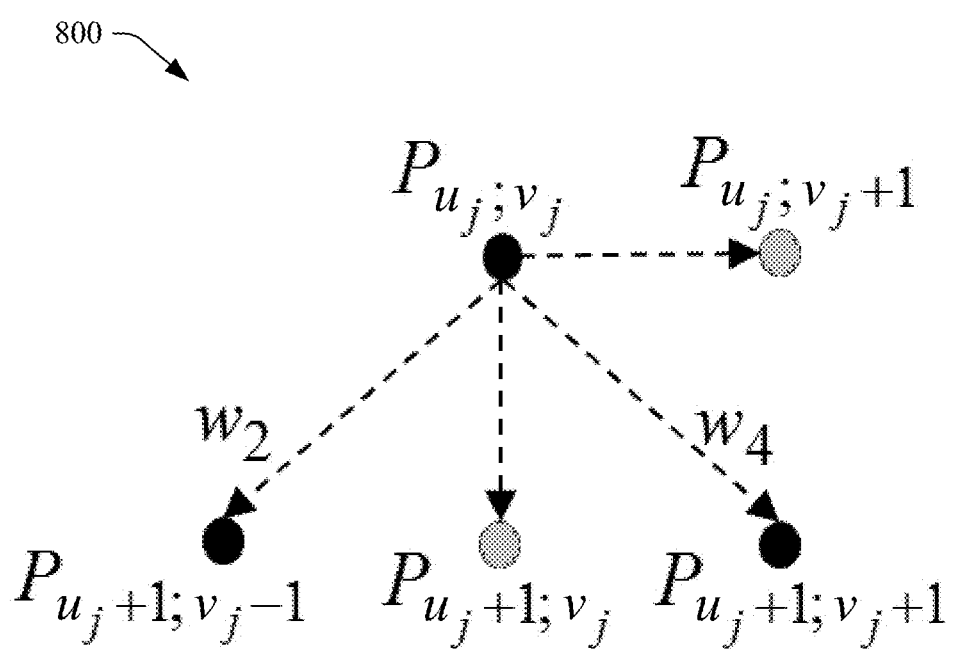
FIG. 8 illustrates a diagram of an example hologram portion comprising dead pixels to facilitate illustrating how dead pixels can be managed during processing of pixels of a complex hologram, in accordance with various aspects and embodiments of the disclosed subject matter.

FIG. 8 presents a diagram of an example hologram portion 800 comprising dead pixels to facilitate illustrating how the hologram processor component 106 can manage dead pixels during processing of pixels of a complex hologram, in accordance with various aspects and embodiments of the disclosed subject matter. As depicted in the example hologram portion 800, pixels $P_{uj;vj+1}$ (highlighted in grey tone) and $P_{uj+1;vj}$ (highlighted in grey tone) can be dead pixels. In such instance, the hologram processor component 106 can determine that it will only diffuse the error of pixel $P_{uj;vj}$ to pixels $P_{uj+1;vj-1}$ and $P_{uj+1;vj+1}$. The hologram processor component 106 also can determine that it will increase the coefficients $w_2$ and $w_4$ by a factor $$C = \frac{1}{(w_2 + w_4)}$$

and can increase the coefficients $w_2$ and $w_4$ by a factor $$C = \frac{1}{(w_2 + w_4)},$$

accordingly. If it happens that all of the four neighbor pixels associated with the scanned and converted (e.g., to phase value) pixel are dead pixels, the hologram processor component 106 will not diffuse the error of the scanned and converted pixel to its neighbor pixels.

Figure 9:
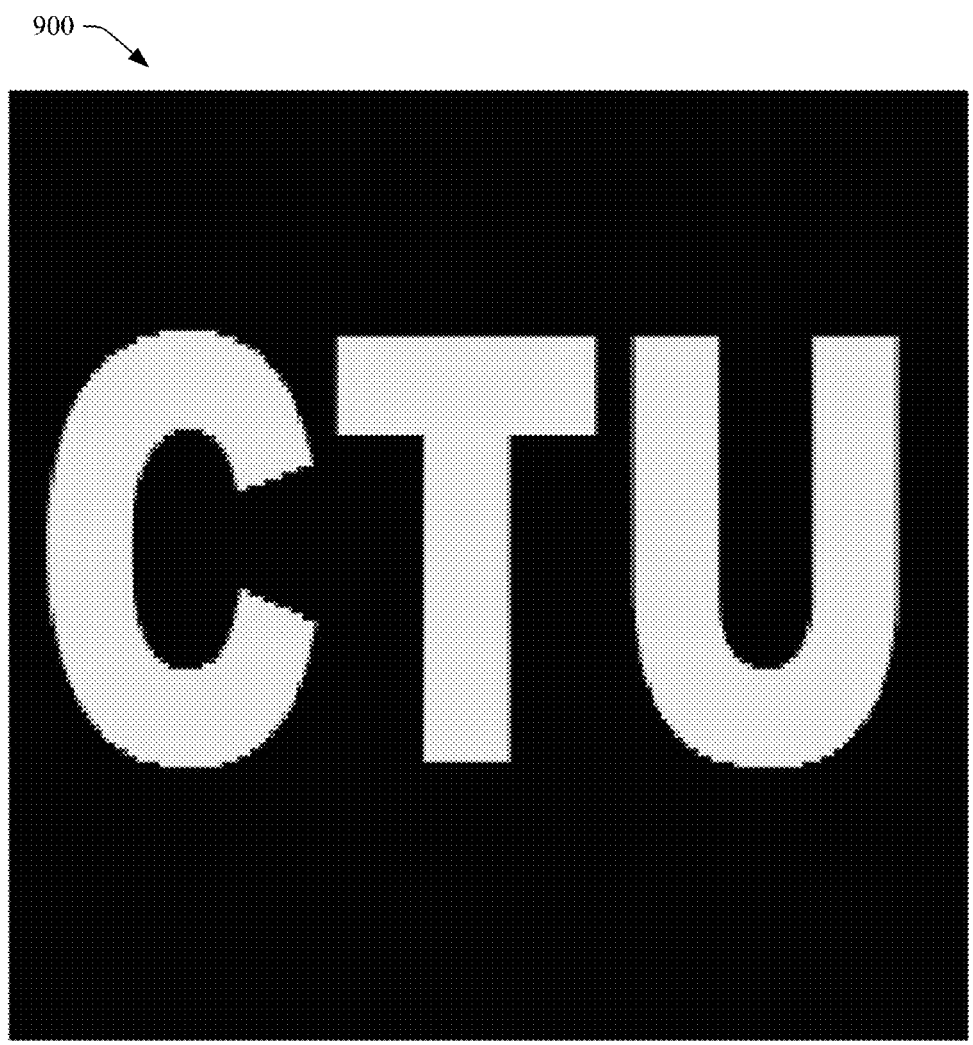
FIG. 9 presents an example binary image.
Figure 10:
FIG. 10 presents an example grey level image.
Figure 11:
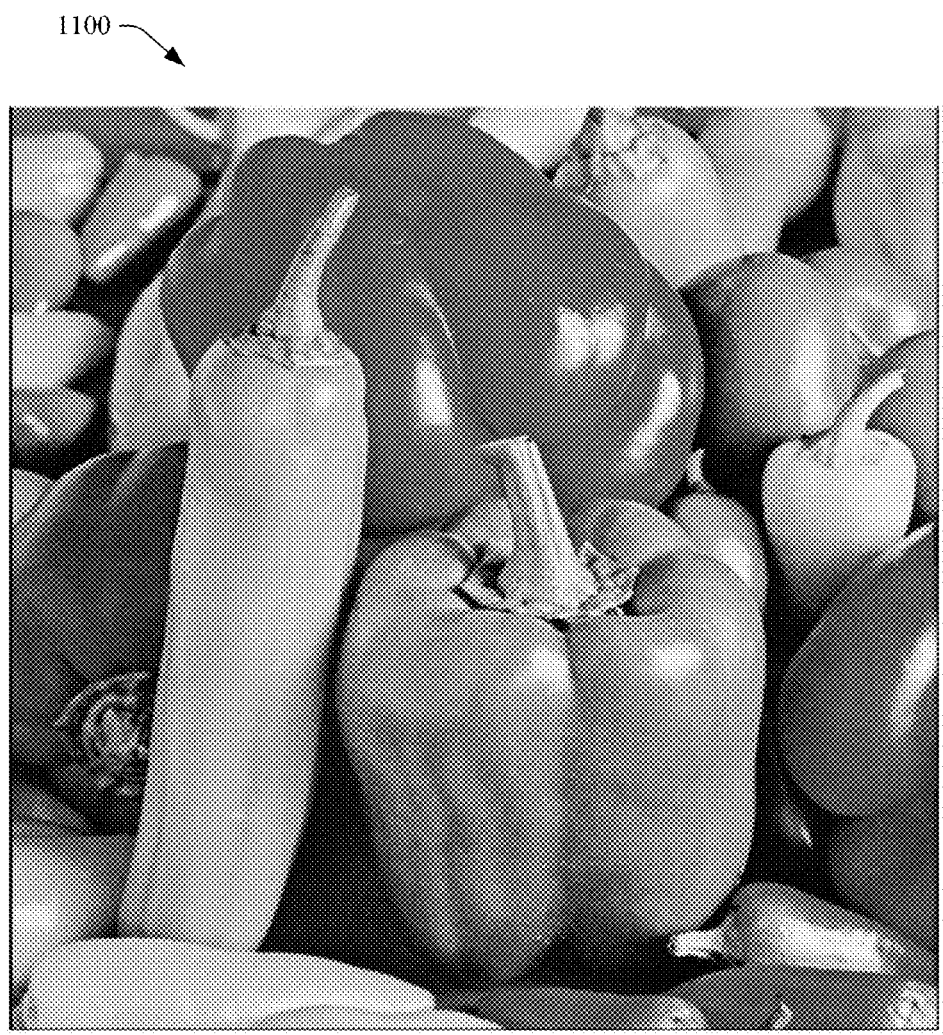
FIG. 11 presents another example grey level image.

Experimental results based on implementation of various aspects of the disclosed subject matter, including the LERDR process, are also disclosed herein. FIGS. 9, 10, and 11 present an example binary image 900 of "CTU", an example grey level image 1000 known as "Lena", and an example grey level image 1100 known as "Peppers", respectively. The images 900, 1000, and 1100 are employed to facilitate evaluating the various aspects of the disclosed subject matter, including the LERDR process. Equation (3) is applied (e.g., by the HGC 102 or another component) to generate the respective complex Fresnel holograms of the respective images 900, 1000, and 1100 based on Fresnel diffraction, in accordance with various aspects and implementations of the disclosed subject matter. The respective complex Fresnel holograms, as well as the test images 900, 1000, and 1100, are comprised of 2048×2048 pixels, each having a square size of 7 micrometers (μm)×7 μm. The wavelength of the optical beam is 650 nm. All of the images are parallel to, and located at 0.3 m from, the hologram plane. The numerical reconstructed images of the 3 complex holograms are visually identical to the original images, and hence are not shown herein.

Figure 12:
FIG. 12 presents a numerical reconstructed image of the respective hologram of the example binary image with the magnitude component removed, in accordance with various aspects and implementations of the disclosed subject matter.
Figure 13:
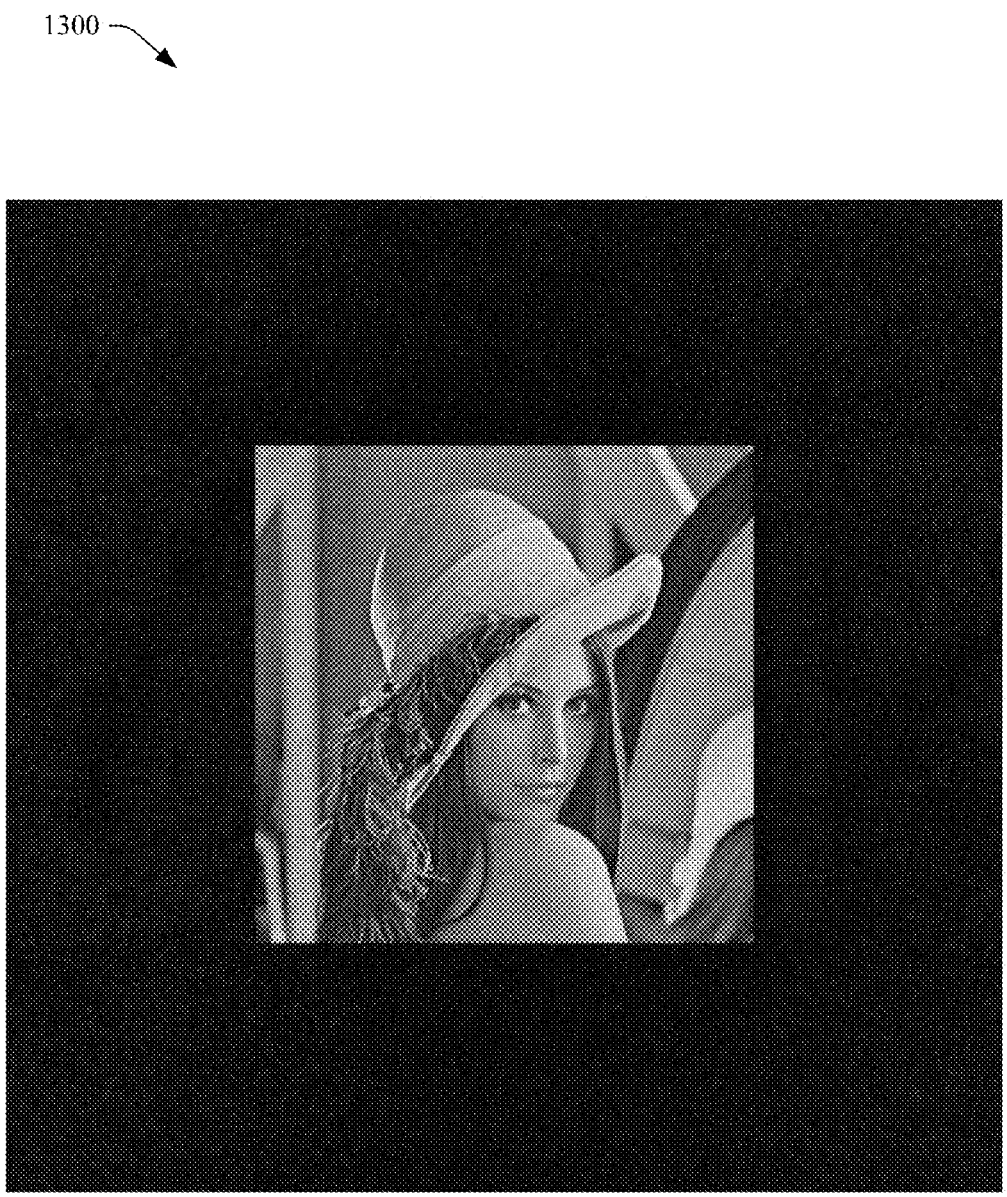
FIG. 13 presents a numerical reconstructed image of the respective hologram of the example grey level image with the magnitude component removed, in accordance with various aspects and implementations of the disclosed subject matter.
Figure 14:
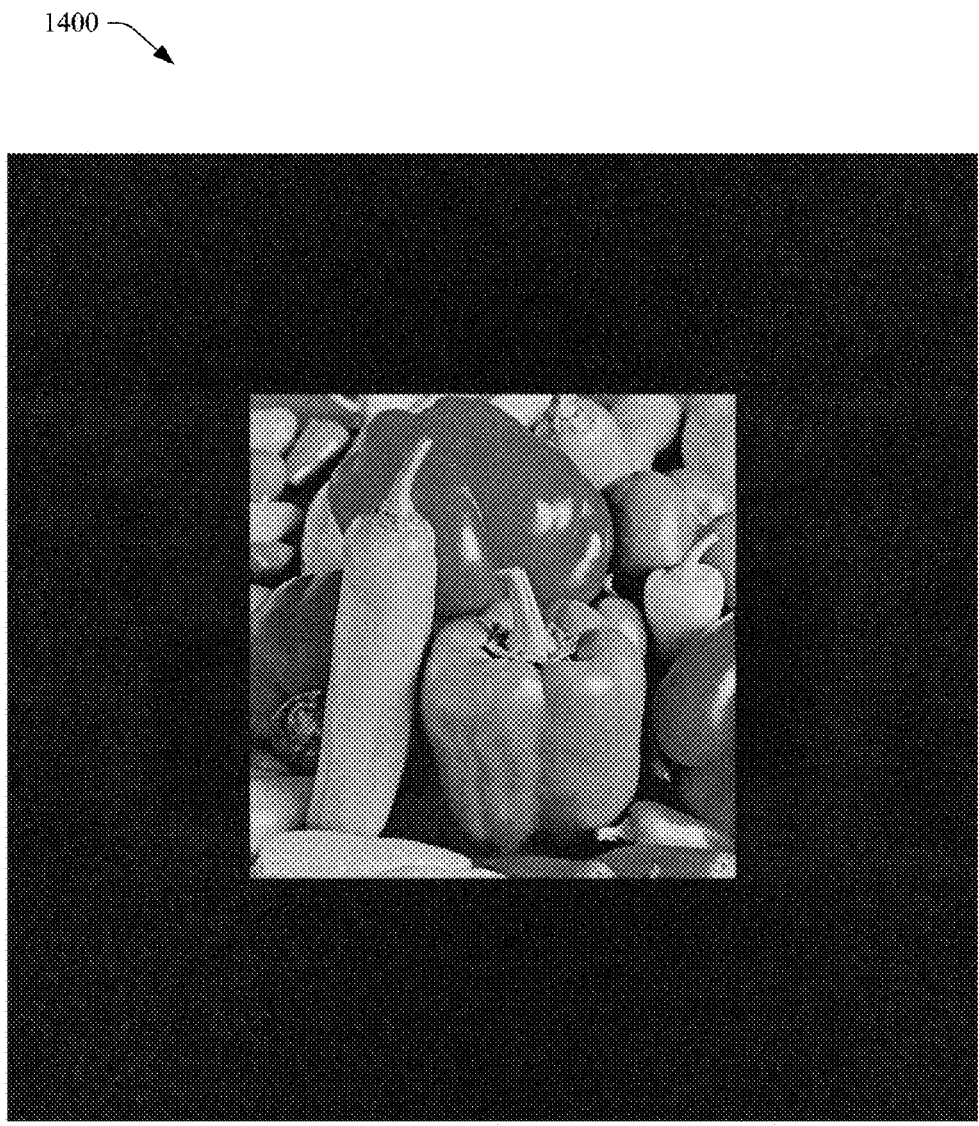
FIG. 14 presents a numerical reconstructed image of the respective hologram of the other example grey level image with the magnitude component removed, in accordance with various aspects and implementations of the disclosed subject matter.

Next, the hologram processor component 106 converts the respective holograms into respective phase-only holograms using the LERD process, the first stage of the LERDR process, wherein the magnitude component of each of the respective holograms can be removed (e.g., by the hologram processor component 106), in accordance with Equation (1), the length of each segment of the holograms is 8 pixels, e.g., M=8. FIGS. 12, 13, and 14 present the numerical reconstructed images 1200, 1300, and 1400, respectively, of the respective holograms with their respective magnitude components removed, in accordance with various aspects and implementations of the disclosed subject matter. In FIGS. 12, 13, and 14, it can be observed that the numerical reconstructed images 1200, 1300, and 1400 are quite noisy, especially at the dark background regions of the respective images.

Figure 15:
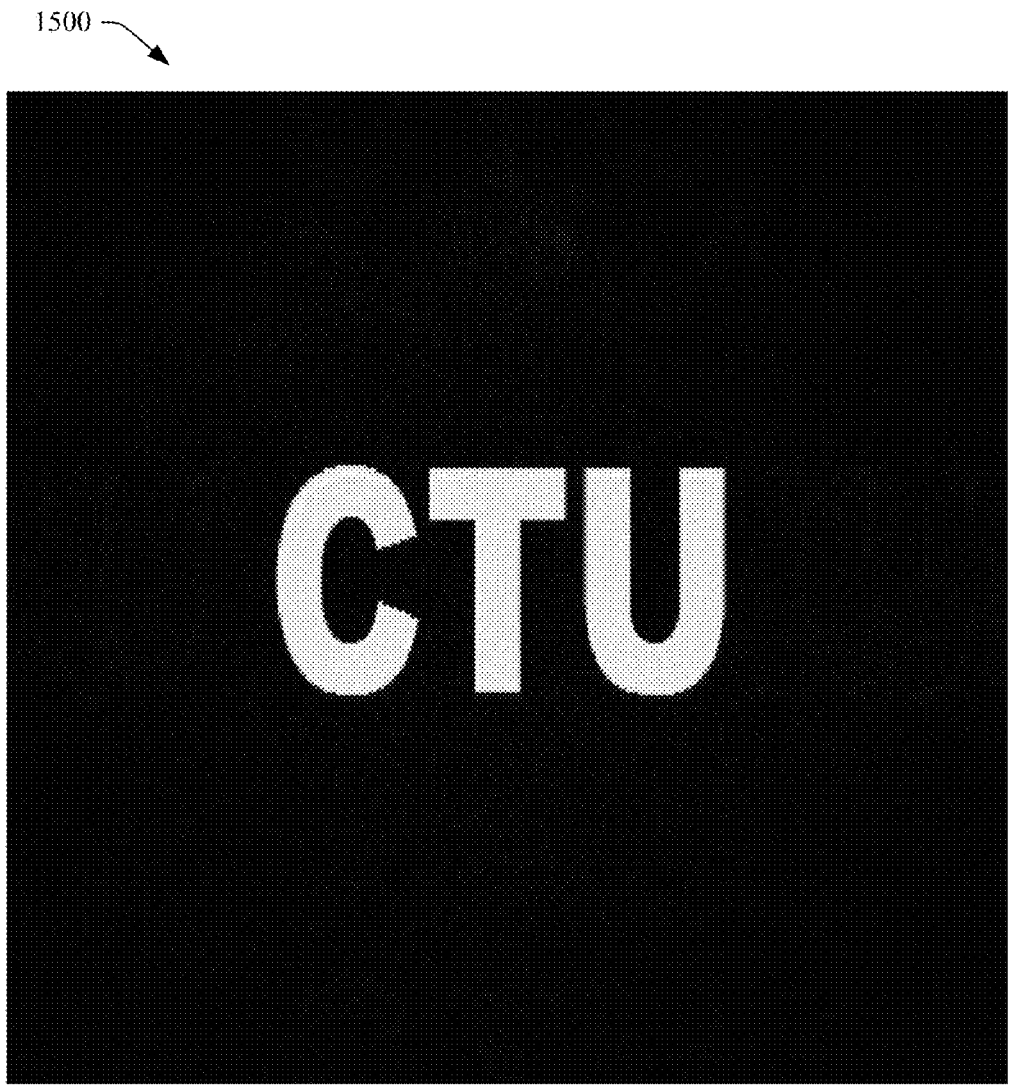
FIG. 15 presents a numerical reconstructed image of a phase hologram, representing the example binary image, that has been derived from converting the complex hologram of the example binary image to the phase hologram, based at least in part on performing the localized error diffusion and redistribution (LERDR) process on the complex hologram, in accordance with various aspects and embodiments of the disclosed subject matter.
Figure 16:
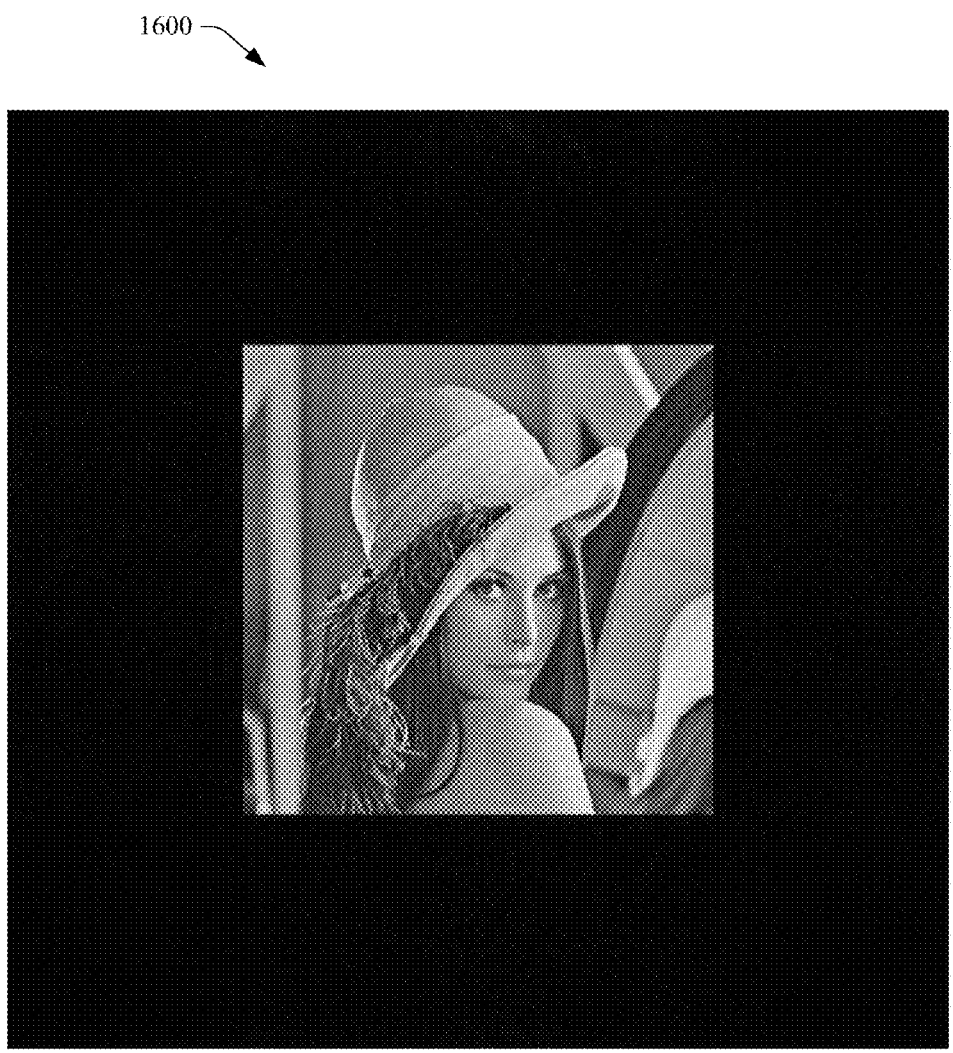
FIG. 16 presents a numerical reconstructed image of a phase hologram, representing the example grey level image, that has been derived from converting the complex hologram of the example grey level to the phase hologram, based at least in part on performing the LERDR process on the complex hologram, in accordance with various aspects and Embodiments of the disclosed subject matter.
Figure 17:
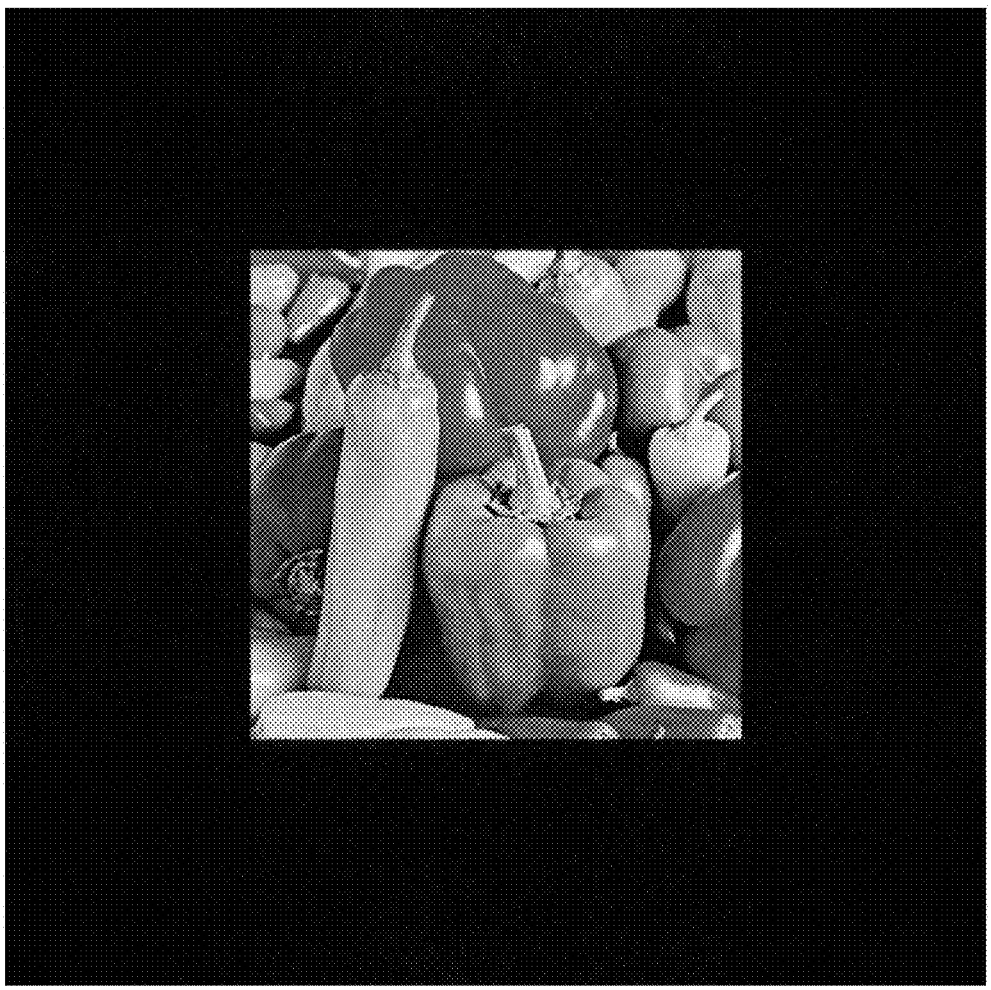
FIG. 17 presents a numerical reconstructed image of a phase hologram, representing the other example grey level image, that has been derived from converting the complex hologram of the other example grey level image to the phase hologram, based at least in part on performing the LERDR process on the complex hologram, in accordance with various aspects and embodiments of the disclosed subject matter.

To facilitate overcoming this noise problem, the hologram processor component 106 also applies the error redistribution process, the second stage of the LERDR process, to the respective phase-only holograms obtained in stage 1 of the LERDR process, to generate respective LERDR holograms, which are phase-only holograms. FIGS. 15, 16, and 17 present the respective reconstructed images 1500, 1600, and 1700 of the respective LERDR holograms. In the respective reconstructed images 1500, 1600, and 1700 of the respective LERDR holograms, it can be observed that the noise signals are no longer present or at least are substantially not present in the respective reconstructed images 1500, 1600, and 1700, and the reconstructed images 1500, 1600, and 1700 have a visual appearance and quality that are similar or at least substantially similar to the appearance and visual quality of the original images 900, 1000, and 1100, respectively.

Quantitative evaluation on the quality of the reconstructed images of the above-mentioned phase-only holograms are listed in Table 1.

TABLE 1

Quantitative comparison between the fidelity of the reconstructed images from the phase-only holograms derived from the LERD (FIGS. 12, 13, and 14), the LERDR (FIGS. 15, 16, and 17), and the BERD methods, with reference to the ones obtained from the original complex holograms. The reported values are PSNR values.

|  | CTU | Lena | Peppers |
| --- | --- | --- | --- |
| LERD method | 24.6 dB | 23.4 dB | 22.9 dB |
| LERDR method | 33.4 dB | 35.0 dB | 34.1 dB |
| BERD method | 36.9 dB | 38.6 dB | 37.4 dB |

The evaluation is based on the peak-signal-to-noise ratio (PSNR), a fidelity measurement which is computed with reference to the reconstructed image of the original complex hologram. The PSNR values for the phase-only holograms derived from the use of the LERD and the LERDR process are given in the first and second rows of the table, respectively. The results are in line with the visual quality of the corresponding images, reflecting relatively low fidelity (small PSNR) for the reconstructed images of the LERD holograms, and high fidelity for the reconstructed images derived from the LERDR process. It can be observed that slight blurring is imposed on the reconstructed images of the LERDR holograms due to the low-pass filtering, but the slight blurring effect is not prominent or significant. For the sake of comparison, the results obtained from the BERD method are shown in the last row of Table 1. Regarding the computation efficiency, the time taken to generate an LERDR hologram is less than 6 milliseconds (ms) based on a personal computer (with a Nvidia GTX 590 GPU), which is about 0.72 seconds/6 ms=120 times, over 2 orders of magnitude, faster than the BERD method.

The disclosed subject matter can have a number of aspects relative to conventional systems, methods, and techniques for hologram processing and generation. One advantage of the disclosed subject matter over conventional systems, methods, and techniques can be that the reconstructed images of the LERDR holograms generated in accordance with the disclosed subject matter can be similar to the reconstructed images obtained with the original complex holograms. Another advantage of the disclosed subject matter over conventional systems, methods, and techniques is that the disclosed subject matter can involve a relatively small amount of computation as compared to conventional systems, methods, and techniques, so that the conversion of a medium size, 2048×2048-pixel complex hologram, or even larger complex holograms (e.g., a 4000×4000-pixel complex hologram oran even larger hologram), can be realized quickly (e.g., at video rate or faster) by using a commodity personal computer that can implement various aspects and embodiments of the disclosedsubject matter. Still another advantage of the disclosed subject matter over conventional systems, methods, and techniques is that the disclosed subject matter can be applied directly on an existing complex Fresnel hologram without the presence of the original object image.

Figure 18:
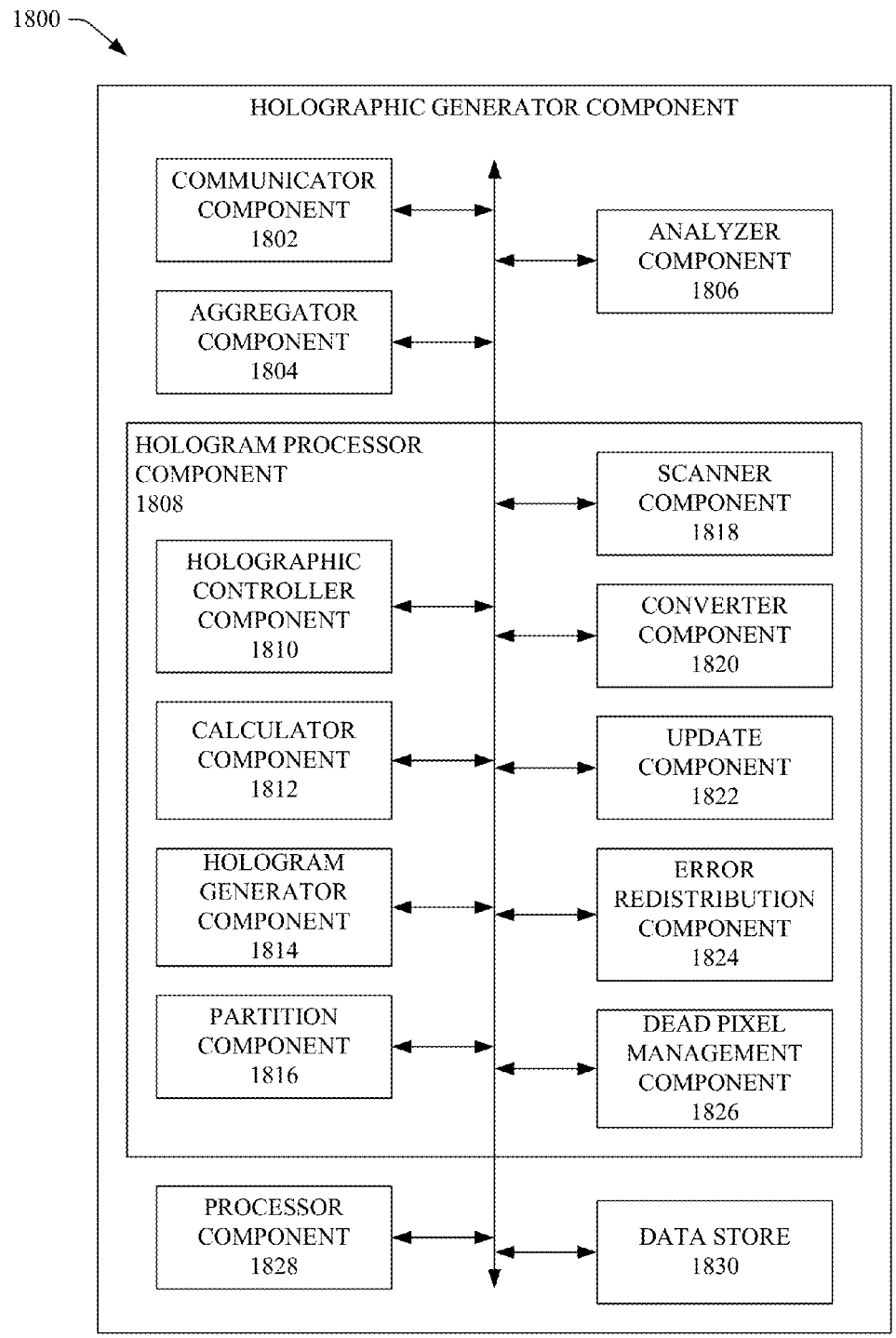
FIG. 18 illustrates a block diagram of an example holographic generator component that can efficiently generate a 3-D phase hologram(s) based at least in part on a 3-D complex hologram(s) of a real or synthetic 3-D object scene(s), in accordance with various aspects and implementations of the disclosed subject matter.

FIG. 18 illustrates a block diagram of an example HGC 1800 that can efficiently generate (e.g., at video rate or faster, in real or at least near real time) a 3-D phase hologram(s) (e.g., a full-parallax 3-D phase hologram(s)) based at least in part on a 3-D complex hologram(s) (e.g., a full-parallax complex 3-D Fresnel hologram(s)) of a real or synthetic 3-D object scene(s), in accordance with various aspects and implementations of the disclosed subject matter. The HGC 1800 can include a communicator component 1802 that can be used to communicate (e.g., transmit, receive) information between the HGC 1800 and other components (e.g., display component(s), scene capture device(s), processor component(s), user interface(s), data store(s), etc.). The information can include, for example, a real or synthetic 3-D object scene, holograms or holographic images, information relating defined hologram generation criterion(s), information relation to an algorithm(s) (e.g., LERDR algorithm, BERD algorithm, UERD algorithm, etc.) that can facilitate generation of holograms or holographic images, etc.

The HGC 1800 can comprise an aggregator component 1804 that can aggregate data received (e.g., obtained) from various entities (e.g., scene capture device(s), display component(s), processor component(s), user interface(s), data store(s), etc.). The aggregator component 1804 can correlate respective items of data based at least in part on type of data, source of the data, time or date the data was generated or received, object point with which data is associated, row (e.g., first row, second row, third row, etc.; odd row, even row) in a hologram (e.g., complex hologram) to which a member (e.g., pixel) belongs, segment in a row to which a member belongs (e.g., first segment in first row, second segment in first row, third segment in first row, etc.), member of a hologram for which another member(s) is a neighbor member, pixel with which a transparency level is associated, visual perspective with which data is associated, etc., to facilitate processing of the data (e.g., analyzing of the data by the analyzer component 1806).

The analyzer component 1806 can analyze data to facilitate determining a partition scheme to use to partition a complex hologram into hologram segments (e.g., determining how long each hologram segment should be), partitioning a complex hologram into segments, converting complex values of members (e.g., pixels) in a complex hologram to phase values (e.g., phase-only or phase-specific values), setting coefficients and/or weightings in connection with diffusing an error associated with a member to its neighbor members, updating values of specified neighbor members of a member in the complex hologram to facilitate diffusing an error associated with the member due to the conversion to the specified neighbor members of the member, redistributing an error associated with a last member of a hologram segment to an adjacent hologram segment, generating a phase hologram (e.g., a POH, phase-specific hologram, or pure phase hologram) associated with an object scene (e.g., 3-D object scene) based at least in part on the complex hologram, identifying a dead pixel(s) in a complex hologram, setting values (e.g., values for the real part and imaginary part) for a dead pixel(s), setting coefficients and/or weightings in connection with a dead pixel(s), and/or identifying elements (e.g., object points, features, etc.) of a 3-D object scene to facilitate generating a hologram (e.g., phase hologram), etc., and can generate analysis results, based at least in part on the data analysis. Based at least in part on the results of this analysis, the HGC 1800 (e.g., using the hologram processor component 1808) can generate a complex hologram based at least in part on an object scene, partition the complex hologram into hologram segments having a desired length (e.g., each having a specified number of members), convert complex values of members of hologram segments of a complex hologram to phase values (e.g., in parallel), determine and/or set coefficients and/or weightings in connection with diffusing an error associated with a member to its neighbor members, update values of specified neighbor members of a member (e.g., with its complex value converted to a phase value) in the complex hologram to facilitate diffusing an error associated with the member due to the conversion to the specified neighbor members of the member, redistribute an error associated with a last member of a hologram segment to an adjacent (e.g., a neighbor) hologram segment, generate a phase hologram associated with an object scene based at least in part on the complex hologram, identify a dead pixel(s) in a complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a 3-D object scene to facilitate generating a hologram, or perform other processes on data relating to holograms.

The HGC 1800 can include the hologram processor component 1808 that can process a complex hologram to generate a phase hologram that can be displayed using a display component, comprising, for example, a phase-only display device. In accordance with various aspects and embodiments, based at least in part on the analysis results, the hologram processor component 1808 can generate a complex hologram based at least in part on an object scene, partition the complex hologram into hologram segments having a desired length, convert complex values of members in a complex hologram to phase values (e.g., in parallel), determine and/or set coefficients and/or weightings in connection with diffusing an error associated with a member to its neighbor members, update values of specified neighbor members of a member (e.g., with its complex value converted to a phase value) in the complex hologram to facilitate diffusing an error associated with the member due to the conversion to the specified neighbor members of the member, redistribute an error associated with a last member of a hologram segment to an adjacent hologram segment, generate a phase hologram associated with an object scene based at least in part on the complex hologram, identify a dead pixel(s) in a complex hologram, determine and/or set values (e.g., values for the real part and imaginary part) for a dead pixel(s), determine and/or set coefficients and/or weightings in connection with a dead pixel(s), and/or identify elements (e.g., object points, features, etc.) of a 3-D object scene to facilitate generating a hologram, or perform other processes on data relating to holograms. In some implementations, the hologram processor component 1808 can comprise, for example, a holographic controller component 1810, a calculator component 1812, a hologram generator component 1814, a partition component 1816, a scanner component 1818, a converter component 1820, an update component 1822, an error redistribution component 1824, and/or a dead pixel management component 1826.

The holographic controller component 1810 can control operations relating to processing and generating a complex hologram (e.g., a full-parallax complex 3-D Fresnel hologram), generating a phase hologram based at least in part on the complex hologram, and/or generating corresponding reconstructed holographic images based at least in part on the phase hologram. The holographic controller component 1810 can facilitate controlling operations being performed by various components of the hologram processor component 1808, controlling data flow between various components of the hologram processor component 1808, controlling data flow between the hologram processor component 1808 and other components of the HGC 1800, etc.

The calculator component 1812 can perform calculations on data (e.g., data with respective values), in accordance with various equations (e.g., mathematical expressions), to facilitate generating a complex hologram, partitioning a complex hologram into hologram segments, generating a phase hologram based at least in part on a complex hologram, converting a complex value of a member of a complex hologram to a phase value, determining or calculating coefficients or weightings associated with diffusing an error associated with a member to its neighbor members, updating complex values of specified neighbor members of a member that has had its complex value converted to a phase value, redistributing an error associated with a last member of a hologram segment to an adjacent hologram segment, determining or calculating values for dead pixels, determining or calculating coefficients or weightings associated with dead pixels, etc. The calculator component 1812 can facilitate calculating, for example, results for one or more equations relating to generating or processing phase holograms, including the equations disclosed herein.

The hologram generator component 1814 can facilitate generating a complex hologram that can represent an object scene at a desired rate (e.g., at video rate or a faster rate (e.g., approximately 40 frames per second or faster)), for example, using one or more of the fast hologram generation techniques, processes, or methods, as disclosed herein. The hologram generator component 1814 also can facilitate processing a complex hologram to generate a phase hologram that can correspond to the complex hologram at a desired rate (e.g., at video rate or a faster rate (e.g., approximately 40 frames per second or faster)).

The partition component 1816 can partition a complex hologram into a plurality of hologram segments, wherein each hologram segment can comprise a desired or specified number of members (e.g., pixels), for example, in accordance with the LERDR process or algorithm. When partitioning the complex hologram, the partition component 1816 can partition the hologram segments uniformly (e.g., each hologram segment can comprise the same number of members as the other hologram segments). When partitioning the complex hologram, the partition component 1816 also can partition the complex hologram into hologram segments that do not overlap each other, wherein each pixel of the complex hologram is only able to a member of one particular hologram segment.

The scanner component 1818 can visit, scan, analyze, or examine members (e.g., pixels) of segments of a complex hologram to facilitate converting the complex values of members to phase values. The scanner component 1818 also can facilitate determining the complex values of respective members of the complex hologram. The scanner component 1818 can scan members of a complex hologram, in accordance with, for example, an LERDR process, a BERD process, or a UERD process, as more fully disclosed herein. For example, when the LERDR process is employed, the scanner component 1818 can visit, scan, analyze, or examine members of segments of a complex hologram in segment by segment, and row by row manner (e.g., scanning pixels in a first segment of a first row, scanning pixels in a second segment of the first row, and so on), for example, in a left to right manner (e.g., by scanning a pixel in a row, scanning a next pixel that is to the right of the pixel in the row, and so on), or alternatively, in a right to left manner (e.g., by scanning a pixel in a first segment of a first row, scanning a next pixel that is to the left of the pixel in that segment, and so on). When the BERD process is employed, the scanner component 1818 can visit, scan, analyze, or examine members of an odd row of a complex hologram in a first direction (e.g., left-to-right direction), and can visit, scan, analyze, or examine members of an even row of the complex hologram in a second direction (e.g., right-to-left direction). When the UERD process is employed, the scanner component 1818 can visit, scan, analyze, or examine members of a complex hologram in a row by row manner (e.g., scanning pixels in a first row, scanning pixels in a second row, and so on), for example, in a left to right manner (e.g., by scanning a pixel in a row, scanning a next pixel that is to the right of the pixel in the row, and so on).

The converter component 1820 can convert the complex value of a member of a hologram to a phase value (e.g., a phase-only or phase-specific value). For instance, the converter component 1820 can set or modify the magnitude of each member to a desired constant value (e.g., a value of unity, so that the magnitude component of the member can be transparent), which can remove the magnitude information, for example, in accordance with Equation (1).

The update component 1822 can facilitate updating the complex values of certain (e.g., specified, not yet visited) neighbor members in a complex hologram that are in proximity to a member that has had its complex value modified or converted to a phase value. The update component 1822 can perform the updates of the complex values of these certain neighbor members to facilitate diffusing an error, which is associated with the conversion of the complex value of the member to the phase value, to these certain neighbor members, as more fully disclosed herein (e.g., in accordance with the applicable equations disclosed herein, and the processes (e.g., LERDR process, BERD process, UERD process) disclosed herein).

The error redistribution component 1824 can facilitate redistributing an error associated with converting a complex value of a last member of a hologram segment to a phase value to another hologram segment that can be adjacent (e.g., can neighbor) the last member and the hologram segment. In some implementations, the error redistribution component 1824 can perform or apply low-pass filtering (e.g., using a low-pass filter) to the phase hologram (e.g., an LERD hologram prior to error redistribution), and/or to each last member of a hologram segment or its associated hologram segment in the phase hologram, to facilitate redistributing the error (e.g., the error signal) associated with the last member of each hologram segment so that the error in the last member of each segment of the phase hologram can be diffused to its adjacent hologram segment in the phase hologram. To facilitate applying the low-pass filtering, the error redistribution component 1824 can facilitate redistributing the error associated with the last member, for example, in accordance with Equations 11 and/or 12, as more fully disclosed herein. Performing error redistribution on the LERD hologram by the error redistribution component 1824 can generate a phase hologram that is an LERDR hologram.

The dead pixel management component 1826 can be employed to facilitate managing any dead pixels that are identified or detected in a complex hologram. The dead pixel management component 1826 can facilitate decreasing the sensitivity of a phase hologram towards dead pixels (e.g., pixels that are opaque, or transparent with no phase shift, or a constant phase shift that is independent to the value applied to the pixel). For example, for a dead pixel that is opaque, the dead pixel management component 1826 can set or modify the values (e.g., complex and imaginary parts) of such dead pixel to zero. For a dead pixel that is transparent with no phase shift, the dead pixel management component 1826 can set or modify the real part and imaginary part of the dead pixel's value to unity (e.g., one) and zero, respectively. For a dead pixel with a constant phase shift φ, the dead pixel management component 1826 can set or modify the values of the dead pixel's real part and imaginary part to cos(φ) and sin(φ), respectively. The dead pixel management component 1826 also can facilitate determining or modifying weighting factors or coefficient values applied during an error diffusing process to facilitate accounting for the dead pixels, as more fully disclosed herein.

The HGC 1800 also can comprise a processor component 1828 that can operate in conjunction with the other components (e.g., communicator component 1802, aggregator component 1804, analyzer component 1806, hologram processor component 1808, etc.) to facilitate performing the various functions of the HGC 1800. The processor component 1828 can employ one or more processors (e.g., central processing units (CPUs), GPUs, FPGAs, etc.), microprocessors, or controllers that can process data, such as information (e.g., visual information) relating to an object scene (e.g., 3-D object scene), holographic data, data relating to parameters associated with the HGC 1800 and associated components, etc., to facilitate generating holograms (e.g., full-parallax complex 3-D Fresnel hologram, phase hologram based on the complex hologram) and corresponding holographic images representative of a 3-D object scene; and can control data flow between the HGC 1800 and other components associated with the HGC 1800.

In yet another aspect, the HGC 1800 can contain a data store 1830 that can store data structures (e.g., user data, metadata); code structure(s) (e.g., modules, objects, classes, procedures), commands, or instructions; information relating to object points; information relating to (e.g., representative of) an object scene; model data; holographic data; information relating to generating a hologram, partitioning a complex hologram into hologram segments, converting a complex value of a member of a complex hologram to a phase value, diffusing an error associated with a member to certain neighbor members of the member, redistributing an error associated with a last member of a hologram segment to an adjacent hologram segment, managing dead pixels in a complex hologram, etc.; parameter data; algorithms (e.g., algorithm(s) relating to fast generation of holograms at a desired rate (e.g., at video rate or faster); algorithm(s) relating to generating a complex hologram; LERDR algorithm; BERD algorithm; UERD algorithm; etc.); criterion(s) relating to hologram generation; and so on. In an aspect, the processor component 1828 can be functionally coupled (e.g., through a memory bus) to the data store 1830 in order to store and retrieve information desired to operate and/or confer functionality, at least in part, to the communicator component 1802, aggregator component 1804, analyzer component 1806, hologram processor component 1808, etc., and/or substantially any other operational aspects of the HGC 1800. It is to be appreciated and understood that the various components of the HGC 1800 can communicate information between each other and/or between other components associated with the HGC 1800 as desired to carry out operations of the HGC 1800. It is to be further appreciated and understood that respective components (e.g., communicator component 1802, aggregator component 1804, analyzer component 1806, hologram processor component 1808, etc.) of the HGC 1800 each can be a stand-alone unit, can be included within the HGC 1800 (as depicted), can be incorporated within another component of the HGC 1800 (e.g., hologram processor component 1808) or a component separate from the HGC 1800, and/or virtually any suitable combination thereof, as desired.

It is to be appreciated and understood that, in accordance with various other aspects and embodiments, the HGC 1800 or components associated therewith can include or be associated with other components (not shown for reasons of brevity), such as, for example, a modeler component (e.g., to facilitate generating model data that can be used to generate or display a hologram), adapter components (e.g., to facilitate adapting or modifying holographic images or data to facilitate desirably generating or displaying the hologram), a reference beam component (e.g., to apply a reference beam to a 3-D object scene and/or a 3-D hologram), a render component (e.g., to render or convert data, such as model data or diffraction pattern data, associated with the 3-D object scene into corresponding holographic data, which can be used to generate a hologram that is a reproduction of the 3-D object scene), a reflector component(s) (e.g., to reflect holographic images to facilitate display of the hologram), and/or display partitions (e.g., to partition a display into a desired number of partitions in order to show different views of the hologram), etc., that can be employed to facilitate generating a hologram and/or generating or displaying corresponding holographic images representing a 3-D object scene.

Figure 19:
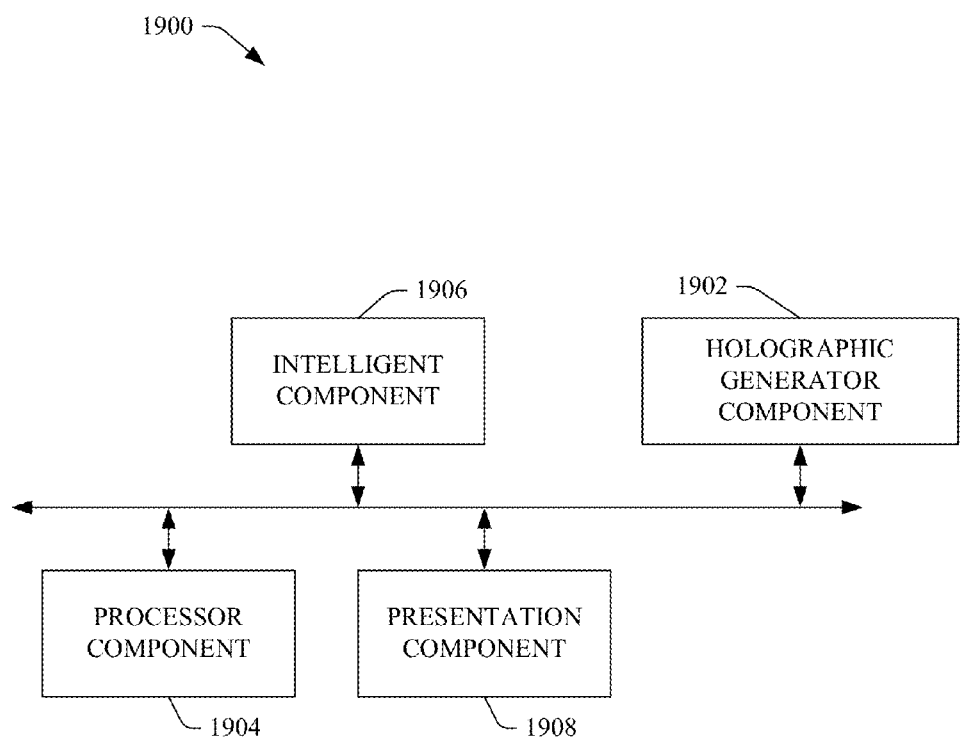
FIG. 19 depicts a system that can employ intelligence to facilitate converting a complex 3-D hologram of a real or synthetic 3-D object scene to a phase hologram to facilitate generating holographic images based at least in part on the phase hologram, in accordance with various aspects and embodiments of the disclosed subject matter.

Referring to FIG. 19, depicted is a block diagram of a system 1900 that can employ intelligence to facilitate converting a complex 3-D hologram (e.g., a full-parallax complex 3-D Fresnel hologram) of a real or synthetic 3-D object scene to a phase hologram to facilitate generating holographic images based at least in part on the phase hologram, in accordance with various aspects and embodiments of the disclosed subject matter. The system 1900 can include an HGC 1902 that can desirably generate a hologram (e.g., sequence of 3-D holographic images) that can represent a 3-D object scene (e.g., real or computer-synthesized 3-D object scene from multiple different viewing perspectives of a 3-D object scene that can correspond to multiple different viewing perspectives of the 3-D object scene), as more fully disclosed herein. It is to be appreciated that the HGC 1902 can be the same or similar as respective components (e.g., respectively named components), and/or can contain the same or similar functionality as respective components, as more fully described herein. The HGC 1902 can include a hologram processor component (not shown in FIG. 19; e.g., as depicted in, or described herein in relation to FIGS. 1 and 18) that can generate a full-parallax digital 3D phase hologram (e.g., Fresnel hologram), based at least in part on the original full-parallax complex digital 3-D Fresnel hologram, to facilitate generating or reconstructing full-parallax digital 3-D holographic images (e.g., 3-D Fresnel holographic images) that can represent or recreate the original real or synthetic 3-D object scene and can be desirably displayed (e.g., with a desirably high quality and resolution) on a display component (e.g., a phase-only display device, such as a phase-only SLM display device or a phase-only LCoS display device), as more fully disclosed herein.

The system 1900 can further include a processor component 1904 that can be associated with (e.g., communicatively connected to) the HGC 1902 and/or other components (e.g., components of system 1900) via a bus. In accordance with an embodiment of the disclosed subject matter, the processor component 1904 can be an applications processor(s) that can manage communications and run applications. For example, the processor component 1904 can be a processor that can be utilized by a computer, mobile computing device, personal data assistant (PDA), or other electronic computing device. The processor component 1904 can generate commands in order to facilitate generating holograms, partitioning a complex hologram into hologram segments, converting complex holograms to phase holograms, diffusing respective errors of respective pixels of a complex hologram to neighbor pixels, redistributing an error associated with last pixels of hologram segments to respective adjacent segments, and/or displaying of holographic images of a 3-D object scene from multiple different viewing perspectives corresponding to the multiple different viewing perspectives of the 3-D object scene obtained or created by the HGC 1902, modifying parameters associated with the HGC 1902, etc.

The system 1900 also can include an intelligent component 1906 that can be associated with (e.g., communicatively connected to) the HGC 1902, the processor component 1904, and/or other components associated with system 1900 to facilitate analyzing data, such as current and/or historical information, and, based at least in part on such information, can make an inference(s) and/or a determination(s) regarding, for example, partitioning a complex hologram into hologram segments, converting a value of a pixel from a complex value to a phase value (e.g., a phase-only or phase-specific value), diffusing an error associated with converting a pixel to a neighbor pixel(s), redistributing an error associated with last pixels of hologram segments to respective adjacent segments, determining a conversion process (e.g., LERDR process, BERD process, UERD process, etc.) to perform on a complex hologram to convert it to a phase hologram, managing the diffusion of an error associated with converting a value of a pixel from a complex value to a phase value to neighbor pixels when a neighbor pixel(s) is a dead pixel(s), to facilitate generating a 3-D hologram (e.g., a phase hologram that is based at least in part on the original complex hologram), and/or corresponding 3-D holographic images that can represent a 3-D object scene, determining and/or setting of parameters associated with the HGC 1902 and associated components, etc.

For example, based in part on current and/or historical evidence, the intelligent component 1906 can infer or determine a size of hologram segments to be used in connection with partitioning a complex hologram into segments, a value (e.g., constant magnitude value) to apply to a pixel to facilitate converting the complex value to a phase value, an operation to perform in connection with diffusing an error associated with converting a pixel to a neighbor pixel(s), an operation to perform in connection with redistributing an error associated with a last pixel of a hologram segment to an adjacent hologram segment, a type of conversion process (e.g., LERDR process, BERD process, UERD process, etc.) to perform on a complex hologram to convert it to a phase hologram, an operation to perform in connection with managing the diffusion of an error that is associated with converting a complex value of a pixel to a phase value to neighbor pixels when a neighbor pixel(s) is a dead pixel(s), respective parameter values of one or more parameters to be used with regard to the performing of operations by the HGC 1902, etc.

In an aspect, the intelligent component 1906 can communicate information related to the inferences and/or determinations to the HGC 1902. Based at least in part on the inference(s) or determination(s) made by the intelligent component 1906, the HGC 1902 can take (e.g., automatically or dynamically take) one or more actions to facilitate generating a 3-D hologram and/or a 3-D holographic image of a 3-D object scene from multiple different viewing perspectives corresponding to the multiple different viewing perspectives of a 3-D object scene obtained or generated by the HGC 1902. For instance, the HGC 1902 can determine, identify, and/or select a size of hologram segments to be used in connection with partitioning a complex hologram into segments, a value (e.g., constant magnitude value) to apply to a pixel to facilitate converting the complex value to a phase value, an operation to perform in connection with diffusing an error associated with converting a pixel to a neighbor pixel(s), an operation to perform in connection with redistributing an error associated with a last pixel of a hologram segment to an adjacent hologram segment, a type of conversion process (e.g., LERDR process, BERD process, UERD process, etc.) to perform on a complex hologram to convert it to a phase hologram, an operation to perform in connection with managing the diffusion of an error that is associated with converting a complex value of a pixel to a phase value to neighbor pixels when a neighbor pixel(s) is a dead pixel(s), respective parameter values of one or more parameters to be used with regard to the performing of operations by the HGC 1902, etc., to facilitate generating a 3-D hologram (e.g., a 3-D phase hologram) and/or 3-D holographic images of a 3-D object scene, as disclosed herein.

It is to be understood that the intelligent component 1906 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1900 also can include a presentation component 1908, which can be connected with the processor component 1904. The presentation component 1908 can provide various types of user interfaces to facilitate interaction between a user and any component coupled to the processor component 1904. As depicted, the presentation component 1908 is a separate entity that can be utilized with the processor component 1904 and associated components. However, it is to be appreciated that the presentation component 1908 and/or similar view components can be incorporated into the processor component 1904 and/or can be a stand-alone unit. The presentation component 1908 can provide one or more graphical user interfaces (GUIs) (e.g., touchscreen GUI), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor component 1904.

The user can also interact with the regions to select and provide information via various devices such as a mouse, a roller ball, a keypad, a keyboard, a touchscreen, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In accordance with one embodiment of the disclosed subject matter, the HGC 1902 and/or other components, can be situated or implemented on a single integrated-circuit chip. In accordance with another embodiment, the HGC 1902, and/or other components, can be implemented on an application-specific integrated-circuit (ASIC) chip. In yet another embodiment, the HGC 1902 and/or other components, can be situated or implemented on multiple dies or chips.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 20:
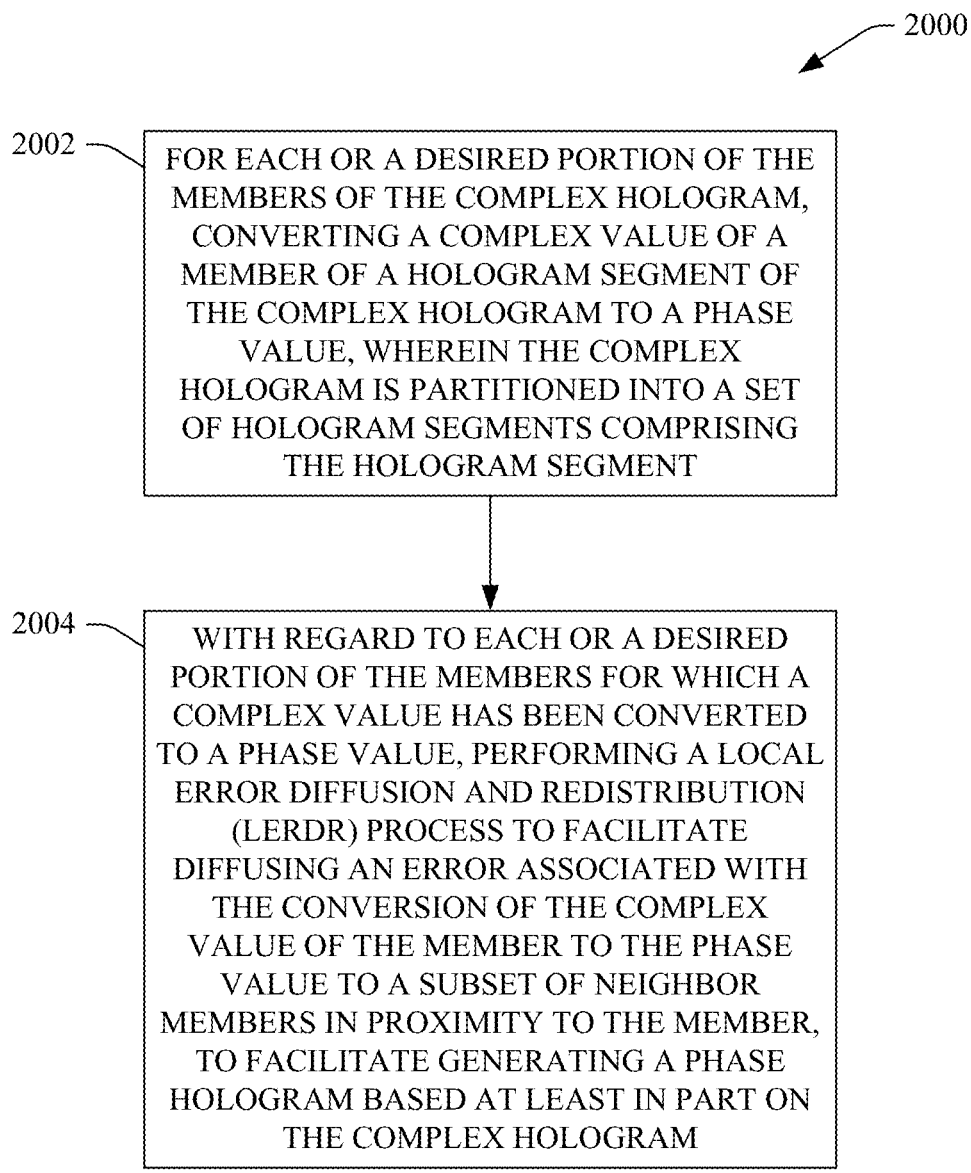
FIG. 20 illustrates a flow diagram of an example method that can efficiently and quickly convert a complex 3-D hologram(s) of a real or synthetic 3-D object scene(s) to generate a phase hologram(s), in accordance with various aspects and embodiments of the disclosed subject matter.
Figure 21:
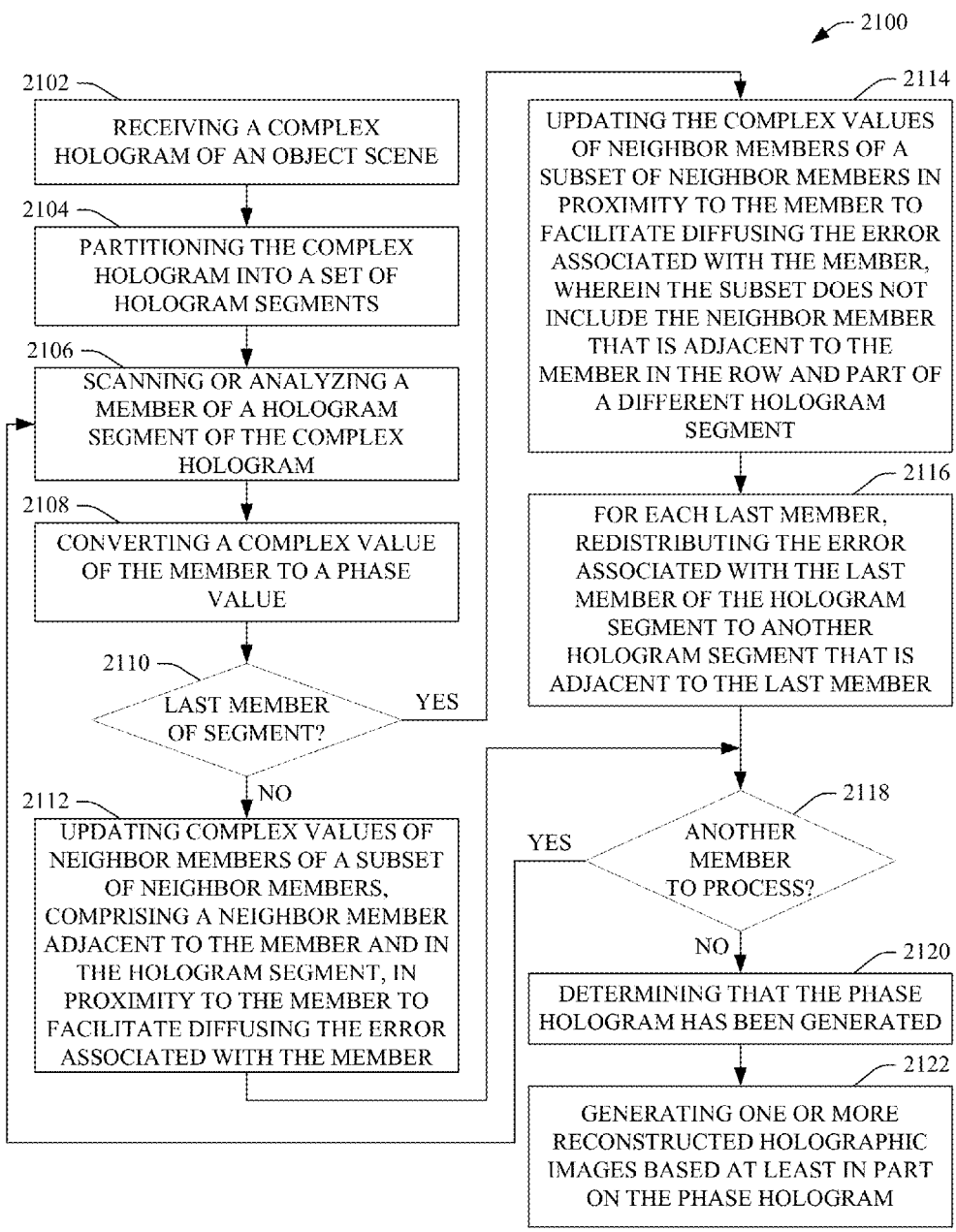
FIG. 21 depicts a flow diagram of another example method that can efficiently and quickly convert a complex 3-D hologram(s) of a real or synthetic 3-D object scene(s) to generate a phase hologram(s) based at least in part on a LERDR process, in accordance with various aspects and embodiments of the disclosed subject matter.

FIGS. 20-21 illustrate methods and/or flow diagrams in accordance with the disclosed subject matter. For simplicity of explanation, the methods are depicted and described as a series of acts. It is to be understood and appreciated that the subject disclosure is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring to FIG. 20, illustrated is a flow diagram of an example method 2000 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a phase hologram(s), in accordance with various aspects and embodiments of the disclosed subject matter. The method 2000 can be implemented by an HGC comprising a hologram processor component. In some implementations, as desired, the hologram processor component can perform all or some of the operations of the method 2000 in parallel (e.g., concurrently).

At 2002, for each or a desired portion of the members (e.g., pixels) of the complex hologram, a complex value of a member of a hologram segment of the complex hologram can be converted to a phase value, wherein the complex hologram is partitioned into a set of hologram segments comprising the hologram segment. The hologram processor component can receive or generate a complex hologram that can represent a 3-D object scene from a desired number of different visual perspectives of the original 3-D object scene. The complex hologram can comprise a set of members, wherein the set of members can comprise a magnitude portion and a phase portion (e.g., each member can have a complex value comprising a magnitude portion and a phase portion of the complex value).

The hologram processor component can partition the complex hologram into a set of hologram segments, wherein each hologram segment (e.g., hologram portion) can comprise a subset of members of the set of members of the complex hologram. With regard to each or a desired portion of the respective members of the respective hologram segments of the complex hologram, the hologram processor component can convert the complex value of a member to a phase value (e.g., phase-only, phase-specific, or pure phase value). For instance, as part of employing the LERDR process, the hologram processor component can scan, analyze, or examiner each or a desired portion of the respective members of the respective hologram segments of the complex hologram, and can convert the respective complex values of the respective members to respective phase values, as more fully disclosed herein.

At 2004, with regard to each or a desired portion of the members for which a complex value has been converted to a phase value, a LERDR process can be performed to facilitate diffusing an error associated with the conversion of the complex value of the member to the phase value to a subset of neighbor members in proximity to the member, to facilitate generating a phase hologram based at least in part on the complex hologram. The hologram processor component can perform the LERDR process to facilitate diffusing the error associated with the conversion of the complex value of the member to the phase value to the subset of neighbor members in proximity to the member, to facilitate compensating for or reducing the effect of the error on the other members (e.g., the subset of neighbor members) of the hologram, and generating a phase hologram based at least in part on the complex hologram. The subset of neighbor members of the member can comprise members that are in proximity to (e.g., adjacent to, adjoining, near to, or within a defined distance of) the member that have not been visited or scanned yet by the hologram processor component.

With regard to a member of a hologram segment that is not the last member of a hologram segment, the hologram processor component can perform the defined error diffusion process to facilitate diffusing the error associated with the member to a neighbor member of the hologram segment that is adjacent the member in the hologram segment, and in the same row as the member, and to the three neighbor members that are in the next row (e.g., the row beneath the row where the member resides) and are in proximity to (e.g., are most proximate to) the member in the complex hologram. With regard to a member of a hologram segment that is the last member of a hologram segment, the hologram processor component can perform the defined error diffusion process to facilitate diffusing the error associated with the last member of the segment to the three neighbor members that are in the next row (e.g., the row beneath the row where the member resides) and are in proximity to (e.g., are most proximate to) the last member of the segment in the complex hologram, but does not diffuse the error associated with the last member to the next member in the row that is adjacent to the last member of the segment because the next member is part of another hologram segment. To facilitate addressing or compensating for the error associated with the last member of the segment, the hologram processor component can perform an error redistribution process to facilitate redistributing the error associated with the last member of the segment to the other hologram segment that is adjacent to the last member (and its associated hologram segment) in the row of the hologram, as more fully disclosed herein.

The HGC and/or display component can facilitate generating and displaying holographic images that can represent an original object scene, based at least in part on the phase hologram, for presentation to an observer(s), wherein the holographic images can be full-parallax 3-D holographic images that can represent the original 3-D object scene from different visual perspectives of the original 3-D object scene. The reconstructed holographic images can be generated, for example, by applying a coherent optical beam to the phase hologram.

Turning to FIG. 21, depicted is a flow diagram of an example method 2100 that can efficiently and quickly (e.g., at video rate or faster, in real time or at least near real time) convert a complex 3-D hologram(s) (e.g., a complex full-parallax 3-D Fresnel hologram(s)) of a real or synthetic 3-D object scene(s) to generate a phase hologram(s) based at least in part on an LERDR process, in accordance with various aspects and embodiments of the disclosed subject matter. The method 2100 can be implemented by an HGC comprising a hologram processor component, a display component, and/or another component. In some implementations, as desired, the hologram processor component can perform all or some of the operations of the method 2100 in parallel (e.g., concurrently).

At 2102, a complex hologram of an object scene can be received. The HGC can generate or obtain a complex hologram (e.g., a complex full-parallax 3-D digital Fresnel hologram) that can represent a 3-D object scene from a desired number of visual perspectives. The complex hologram can be based at least in part on a real and/or synthetic 3-D object scene. The hologram processor component can receive the complex hologram of the 3-D object scene.

At 2104, the complex hologram can be partitioned into a set of hologram segments. The hologram processor component can partition the complex hologram into a set of hologram segments, wherein each hologram segment can comprise a subset of members of the set of members of the complex hologram. The hologram segments can be uniform (e.g., each hologram segment can contain the same number of members as the other holograms segments of the complex hologram). The subset of members of a hologram segment can be members that are in the same row, wherein each member is adjacent to at least one other member in the hologram segment. The hologram segments can be non-overlapping with respect to each other.

At 2106, for each or a desired portion of the respective members (e.g., pixels) of the respective hologram segments of the complex hologram, a member of a hologram segment of the complex hologram can be scanned or analyzed. The hologram processor component can scan or analyze the member to facilitate converting a complex value of the member to a phase value. In accordance with the LERDR process, the hologram processor component can scan or analyze the respective members of the respective hologram segments of the complex hologram in a segment by segment manner (e.g., wherein holograms segments can be scanned or analyzed concurrently) and in a row by row manner (e.g., scanning respective members of a first subset of hologram segments in a first row, scanning respective members of a second subset of hologram segments in a second row, and so on (e.g., from a top row down to a bottom row of the complex hologram)). The hologram processor component can scan or analyze the members, for example, in a left to right manner (e.g., by scanning a member in a row, scanning a next member that is to the right of the member in the row, and so on), or in a right to left manner (e.g., by scanning a member in a row, scanning a next member that is to the left of the member in the row, and so on).

At 2108, for each or a desired portion of the members (e.g., pixels) of the complex hologram, a complex value of the member (e.g., member that was scanned or analyzed at 2106) of the complex hologram can be converted to a phase value. With regard to each or a desired portion of the respective members of the respective hologram segments of the complex hologram, the hologram processor component can convert the complex value of a member to a phase value (e.g., phase-only, phase-specific, or pure phase value). For instance, as part of employing the LERDR process, based at least in part on the scanning of analyzing of the member, the hologram processor component can convert the complex value of the member to a phase value, as more fully disclosed herein.

At 2110, for each member that has had its complex value converted to a phase value, a determination can be made regarding whether the member that had its complex value converted to a phase value is the last member of a hologram segment. For each member that has had its complex value converted to a phase value, the hologram processor component can determine whether the member under evaluation is the last member of the hologram segment. As part of the LERDR process, the hologram processor component can perform the error diffusion process differently for the last member of a hologram segment than it does for the other members of the hologram segment, as more fully disclosed herein.

At 2112, for each member (which is not a last member of a segment) that has had its complex value converted to a phase value, in response to determining that the member under evaluation is not the last member of a hologram segment, the respective complex values of respective neighbor members of a subset of neighbor members in proximity to (e.g., adjacent to, adjoining, near to, or within a defined distance of) the member can be updated to facilitate diffusing the error associated with the member due to the conversion of its complex value to a phase value, wherein the subset of neighbor members can comprise a neighbor member adjacent to the member in the hologram segment (and in the same row as the member) and three neighbor members in the next row adjacent to the row the member is in within the hologram. The neighbor members in the subset of neighbor members can be members that have not been visited or scanned yet by the hologram processor component. For each member that has had its complex value converted to a phase value, the hologram processor component can perform the error diffusion process to facilitate diffusing the error associated with the member to facilitate generating a phase hologram (e.g., a full-parallax 3-D phase hologram) that can represent the original object scene, in accordance with the LERDR process. For instance, as part of the LERDR process, the hologram processor component can update the respective complex values (e.g., complex quantities) of the respective neighbor members of the subset of neighbor members by respective defined error-based values to generate respective new or updated complex values for those respective neighbor members, based at least in part on the error associated with the member due to the conversion and respective defined constant coefficients applicable to the respective neighbor members of the subset of neighbor members, to facilitate compensating for or reducing the effect of such error associated with the member, as more fully disclosed herein.

At 2114, for each last member of a hologram segment that has had its complex value converted to a phase value, in response to determining that the member under evaluation is the last member of a hologram segment, the respective complex values of respective neighbor members of a subset of neighbor members in proximity to the member can be updated to facilitate diffusing the error associated with the member due to the conversion of its complex value to a phase value, wherein the subset of neighbor members can comprise three neighbor members of the member that are in the next row adjacent to the row the member is in within the hologram. The subset of neighbor members does not include the neighbor member adjacent to (e.g., to the right of) the member in the row (e.g., to the right of the member in the row when the members are being scanned in a left to right manner), as that neighbor member is part of a different hologram segment. The neighbor members in the subset of neighbor members can be members that have not been visited or scanned yet by the hologram processor component.

For each member that has had its complex value converted to a phase value, the hologram processor component can perform the error diffusion process (as this process is modified with regard to a last member of a segment) to facilitate diffusing the error associated with the member to facilitate generating a phase hologram that can represent the original object scene, in accordance with the LERDR process. For example, as part of the LERDR process, the hologram processor component can update the respective complex values of the respective neighbor members of the subset of neighbor members by respective defined error-based values to generate respective new or updated complex values for those respective neighbor members, based at least in part on the error associated with the member due to the conversion and respective defined constant coefficients applicable to the respective neighbor members of the subset of neighbor members, to facilitate compensating for or reducing the effect of such error associated with the member, as more fully disclosed herein. The defined constant coefficients used by the hologram processor component with respect to performing the error diffusion process to diffuse an error associated with a last member of a hologram segment can be different from the defined constant coefficients used by the hologram processor component with respect to performing the error diffusion process to diffuse an error associated with a member of the hologram segment that is not the last member.

Since the last member of a hologram segment does not have the error associated with its conversion desirably or adequately compensated because, during the error diffusion process, the error was not also diffused to the member adjacent to (e.g., to the right of) the last member in the row, it can be desirable to perform an error redistribution process to facilitate redistributing the error associated with the last member to the neighbor hologram segment that is adjacent to the last member (and adjacent to the hologram segment to which the last member belongs). Accordingly, at 2116, with regard to the respective errors associated with the respective last members of the respective hologram segments, the error associated with the last member of the hologram segment can be redistributed to another hologram segment that is adjacent to the last member (and adjacent to the hologram segment). The hologram processor component can perform the error redistribution process to facilitate redistributing the error associated a last member of a hologram segment to a neighbor hologram segment that is adjacent to the last member (and adjacent to the hologram segment), as more fully disclosed herein.

From reference numeral 2112 or reference numeral 2116, the method 2100 can proceed to reference numeral 2118. At 2118, a determination can be made regarding whether any members of the hologram remain to be processed (e.g., scanned and converted). The hologram processor component can determine whether there are any members of the hologram that remain to be processed.

In response to determining that there are one or more members of the hologram that remain to be processed, the method 2100 can return to reference numeral 2106 to process the next member of the hologram (e.g., a next member in a hologram segment or a first member of a next hologram segment). The hologram processor component can continue to perform the method 2100, in accordance with the LERDR process, for all or a desired portion of the respective members of the respective hologram segments of the complex hologram to facilitate desirably converting the respective complex values of the members to respective phase values, and diffusing error associated with a given member, after its conversion, to select neighbor members that are in the applicable subset of neighbor members (e.g., neighbor members that have not been visited or scanned) in proximity to that member to generate respective updated complex values for those select neighbor members in the applicable subset of neighbor members, wherein the neighbor members selected for updating can depend on whether the given member under evaluation is a last member of a hologram segment or not. By performing this LERDR process, the hologram processor component can convert the complex hologram to a phase hologram of desirable quality.

In response to determining there are no more members of the hologram that remain to be processed, at 2120, it can be determined that the phase hologram has been generated. The hologram processor component can determine that the generation of the phase hologram (e.g., LERDR hologram) has been completed, in response to determining that no more members of the hologram remain to be processed.

At 2122, one or more reconstructed holographic images can be generated based at least in part on the phase hologram. The HGC and/or display component can facilitate generating one or more reconstructed holographic images based at least in part on the phase hologram. The one or more reconstructed holographic images can represent and reproduce the original 3-D object scene from various visual perspectives. The display component can present the one or more reconstructed holographic images. In some implementations, the display component can be or can comprise, for example, a phase-only display device (e.g., a phase-only SLM display device, a phase-only LCoS display device, etc.).

Figure 22:
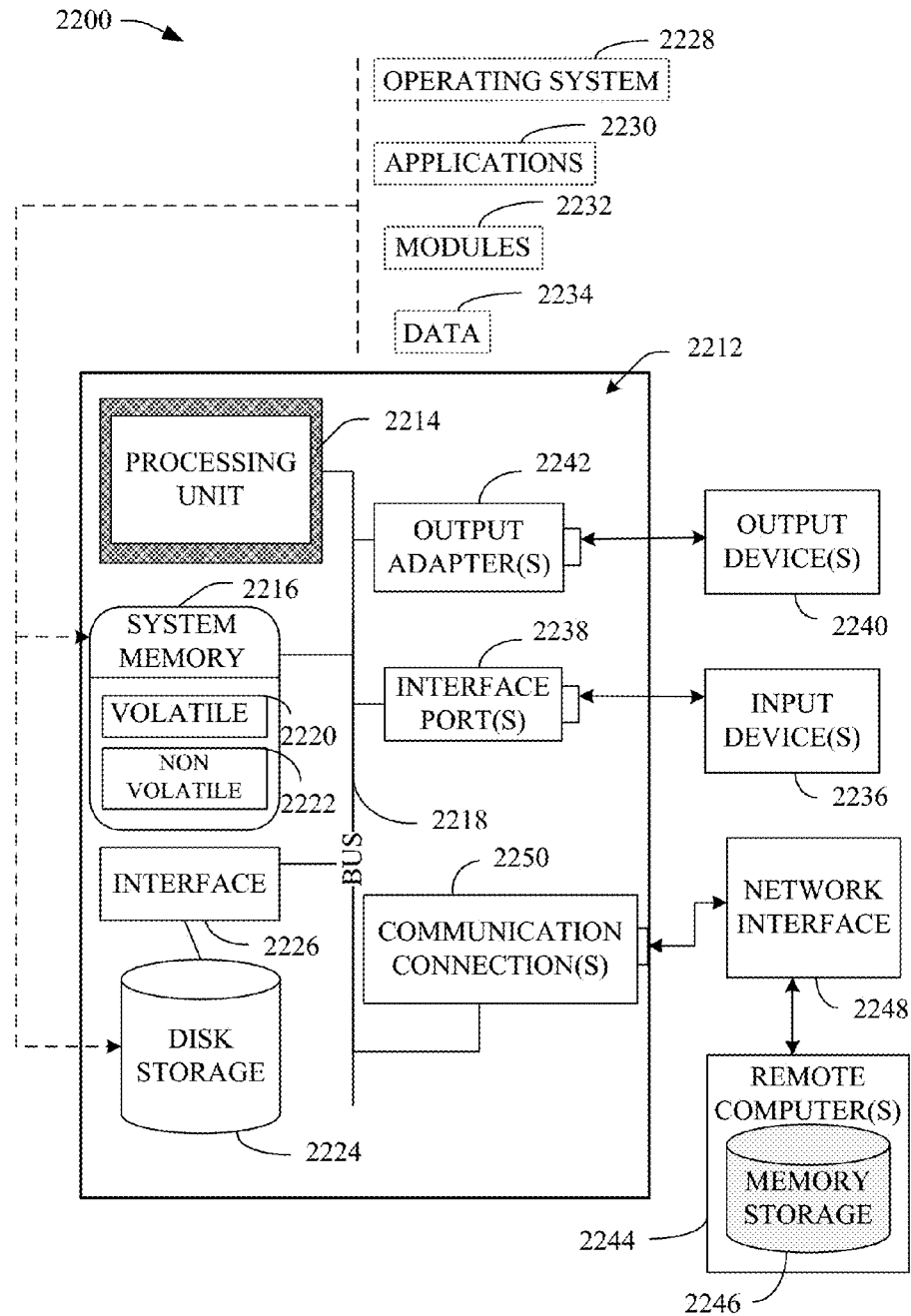
FIG. 22 is a schematic block diagram illustrating a suitable operating environment.
Figure 23:
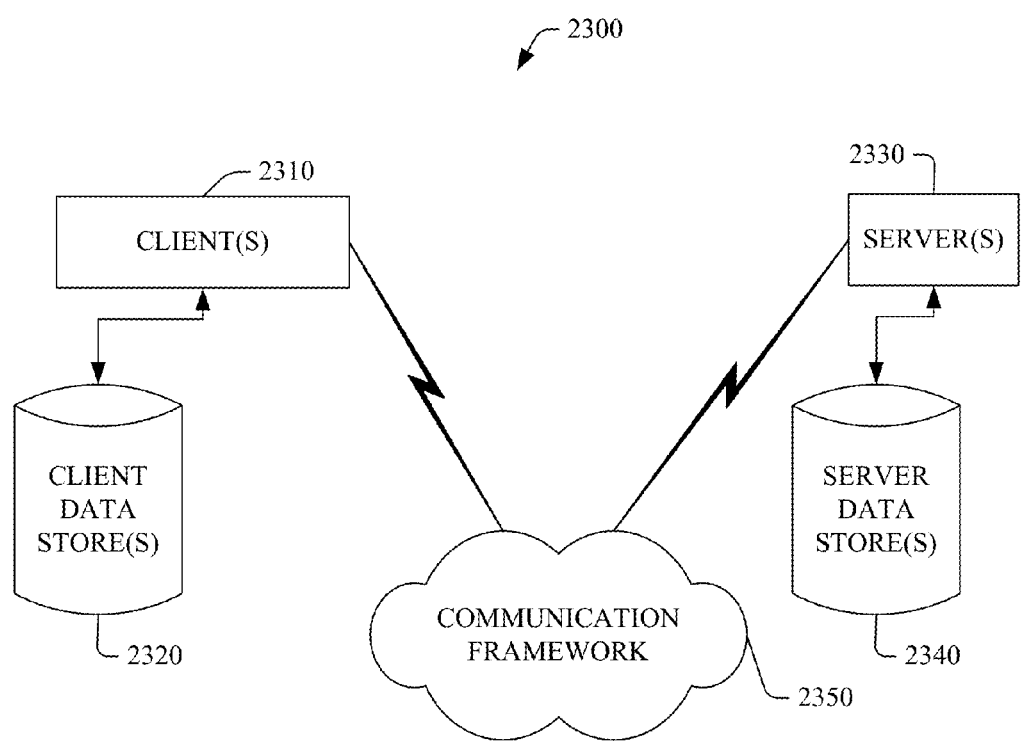
FIG. 23 is a schematic block diagram of a sample-computing environment.

In order to provide a context for the various aspects of the disclosed subject matter, FIGS. 22 and 23 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject disclosure also may be implemented in combination with other program modules. Generally, program modules include routines, programs, components, data structures, etc. that perform particular tasks and/or implement particular abstract data types. Moreover, those skilled in the art will appreciate that the methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the subject disclosure can be practiced on stand-alone computers. In a distributed computing environment, program modules may be located in both local and remote memory storage devices.

With reference to FIG. 22, a suitable environment 2200 for implementing various aspects of the claimed subject matter includes a computer 2212. The computer 2212 includes a processing unit 2214, a system memory 2216, and a system bus 2218. It is to be appreciated that the computer 2212 can be used in connection with implementing one or more of the systems or components (e.g., HGC, hologram processor component, display component, processor component, data store, etc.) shown and/or described in connection with, for example, FIGS. 1-21. The system bus 2218 couples system components including, but not limited to, the system memory 2216 to the processing unit 2214. The processing unit 2214 can be any of various available processors. Dual microprocessors and other multiprocessor architectures also can be employed as the processing unit 2214.

The system bus 2218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 2216 includes volatile memory 2220 and nonvolatile memory 2222. The basic input/output system (BIOS), containing the basic routines to transfer information between elements within the computer 2212, such as during start-up, is stored in nonvolatile memory 2222. By way of illustration, and not limitation, nonvolatile memory 2222 can include read only memory (ROM), programmable ROM (PROM), electrically programmable ROM (EPROM), electrically erasable programmable ROM (EEPROM), or flash memory. Volatile memory 2220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2212 also can include removable/non-removable, volatile/non-volatile computer storage media. FIG. 22 illustrates, for example, a disk storage 2224. Disk storage 2224 includes, but is not limited to, devices like a magnetic disk drive, floppy disk drive, tape drive, Jaz drive, Zip drive, LS-100 drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to the system bus 2218, a removable or non-removable interface is typically used, such as interface 2226).

It is to be appreciated that FIG. 22 describes software that acts as an intermediary between users and the basic computer resources described in the suitable operating environment 2200. Such software includes an operating system 2228. Operating system 2228, which can be stored on disk storage 2224, acts to control and allocate resources of the computer system 2212. System applications 2230 take advantage of the management of resources by operating system 2228 through program modules 2232 and program data 2234 stored either in system memory 2216 or on disk storage 2224. It is to be appreciated that the claimed subject matter can be implemented with various operating systems or combinations of operating systems.

A user enters commands or information into the computer 2212 through input device(s) 2236. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2214 through the system bus 2218 via interface port(s) 2238. Interface port(s) 2238 include, for example, a serial port, a parallel port, a game port, and a universal serial bus (USB). Output device(s) 2240 use some of the same type of ports as input device(s) 2236. Thus, for example, a USB port may be used to provide input to computer 2212, and to output information from computer 2212 to an output device 2240. Output adapter 2242 is provided to illustrate that there are some output devices 2240 like monitors, speakers, and printers, among other output devices 2240, which require special adapters. The output adapters 2242 include, by way of illustration and not limitation, video and sound cards that provide a means of connection between the output device 2240 and the system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. The remote computer(s) 2244 can be a personal computer, a server, a router, a network PC, a workstation, a microprocessor based appliance, a peer device or other common network node and the like, and typically includes many or all of the elements described relative to computer 2212. For purposes of brevity, only a memory storage device 2246 is illustrated with remote computer(s) 2244. Remote computer(s) 2244 is logically connected to computer 2212 through a network interface 2248 and then physically connected via communication connection 2250. Network interface 2248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2250 refers to the hardware/software employed to connect the network interface 2248 to the bus 2218. While communication connection 2250 is shown for illustrative clarity inside computer 2212, it can also be external to computer 2212. The hardware/software necessary for connection to the network interface 2248 includes, for exemplary purposes only, internal and external technologies such as, modems including regular telephone grade modems, cable modems and DSL modems, ISDN adapters, and Ethernet cards.

FIG. 23 is a schematic block diagram of a sample-computing environment 2300 with which the subject disclosure can interact. The system 2300 includes one or more client(s) 2310. The client(s) 2310 can be hardware and/or software (e.g., threads, processes, computing devices). The system 2300 also includes one or more server(s) 2330. Thus, system 2300 can correspond to a two-tier client server model or a multi-tier model (e.g., client, middle tier server, data server), amongst other models. The server(s) 2330 can also be hardware and/or software (e.g., threads, processes, computing devices). The servers 2330 can house threads to perform transformations by employing the subject disclosure, for example. One possible communication between a client 2310 and a server 2330 may be in the form of a data packet transmitted between two or more computer processes.

The system 2300 includes a communication framework 2350 that can be employed to facilitate communications between the client(s) 2310 and the server(s) 2330. The client(s) 2310 are operatively connected to one or more client data store(s) 2320 that can be employed to store information local to the client(s) 2310. Similarly, the server(s) 2330 are operatively connected to one or more server data store(s) 2340 that can be employed to store information local to the servers 2330.

It is to be appreciated and understood that components (e.g., holographic generator component, hologram processor component, display component, processor component, data store, etc.), as described with regard to a particular system or method, can include the same or similar functionality as respective components (e.g., respectively named components or similarly named components) as described with regard to other systems or methods disclosed herein.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As utilized herein, terms "component," "system," and the like, can refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein can encompass a computer program accessible from any computer-readable device, carrier, or media. For example, computer readable media can include, but is not limited to, magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). As used and defined herein, the term "computer-readable storage device" excludes transitory storage media. Of course, those skilled in the art will recognize many modifications can be made to this configuration without departing from the scope or spirit of the disclosed subject matter.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a graphics processing unit (GPU), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

Some portions of the detailed description have been presented in terms of algorithms and/or symbolic representations of operations on data bits within a computer memory. These algorithmic descriptions and/or representations are the means employed by those cognizant in the art to effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

What has been described above includes examples of aspects of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one memory that stores computer-executable components; and
   at least one processor, coupled to the at least one memory, that executes or facilitates execution of the computer-executable components, comprising:
      a holographic generator component that receives or generates a complex hologram that represents an object scene, wherein the complex hologram comprises a set of pixels, and the complex hologram comprises a magnitude portion and a phase portion; and
      a hologram processor component that partitions the complex hologram into a set of hologram segments comprising a first hologram segment and a second hologram segment that is adjacent to the first hologram segment in a row of the complex hologram, converts a first complex value of a first pixel of the first hologram segment to a first phase value, and performs an error diffusion process to facilitate diffusion of a first error associated with the first complex value being converted to the first phase value to facilitate generation of a phase hologram that corresponds to the complex hologram,
      wherein the first hologram segment comprises the first pixel, a second pixel that is adjacent to the first pixel, and a last pixel, wherein the second hologram segment comprises a second-hologram-segment pixel that is adjacent to the last pixel of the first hologram segment in the row of the complex hologram,
      wherein the hologram processor component diffuses the first error associated with the first pixel to first neighbor pixels, comprising the second pixel, in proximity to the first pixel based at least in part on first coefficient values, converts a last complex value of the last pixel of the first hologram segment to a last phase value, and diffuses at least a portion of a second error associated with the last pixel being converted to the last phase value to second neighbor pixels in proximity to the last pixel of the first hologram segment based at least in part on second coefficient values that are different from the first coefficient values, wherein the second neighbor pixels do not include the second-hologram-segment pixel, wherein the second neighbor pixels have not been scanned,
      wherein the hologram processor component performs the error diffusion process on the last pixel to facilitate localized diffusion of at least the portion of the second error associated with the last pixel to the second neighbor pixels, and
      wherein the hologram processor component applies a low-pass filter to the last pixel to facilitate redistribution of at least another portion of the second error associated with the last pixel by diffusion of at least the other portion of the second error to the second hologram segment that is in proximity to the last pixel.

2. The system of claim 1, wherein the hologram processor component scans the first pixel to facilitate the conversion the first complex value of the first pixel to the first phase value.

3. The system of claim 1, wherein the hologram processor component performs the error diffusion process on the first pixel to facilitate localized diffusion of the first error associated with the first pixel to at least one other pixel of the set of pixels that is in proximity to the first pixel, and wherein the first neighbor pixels comprise the at least one other pixel.

4. The system of claim 3, wherein the set of pixels of the complex hologram are arranged in a set of rows, comprising the first row and a second row, wherein the first row comprises the first hologram segment and the second hologram segment of the set of hologram segments that is adjacent to the first hologram segment, and wherein the first hologram segment comprises a first subset of pixels, comprising the first pixel, the second pixel, and the last pixel, and the second hologram segment comprises a second subset of pixels.

5. The system of claim 4, wherein, in accordance with the error diffusion process, the hologram processor component scans the first subset of pixels of the first hologram segment proceeding from the first pixel of the first subset of pixels at one side of the first hologram segment to the last pixel of the first subset of pixels at another side of the first hologram segment.

6. The system of claim 5, wherein the hologram processor component performs the error diffusion process on the last pixel to facilitate diffusion of at least the portion of the second error associated with the last pixel to a third subset of pixels of the set of pixels that is in proximity to the last pixel.

7. The system of claim 6, wherein the hologram processor component performs an error redistribution process in connection with the last pixel to facilitate the redistribution of at least the other portion of the second error associated with the last pixel to the second hologram segment.

8. The system of claim 1, wherein, to facilitate the application of the low-pass filter in connection with the performance of the error redistribution process, the hologram processor component convolves the phase hologram with a low-pass function.

9. The system of claim 5, wherein the hologram processor component at least two of, in parallel,
converts respective complex values of respective pixels of the first subset of pixels of the first hologram segment to respective phase values,
converts respective other complex values of respective other pixels of a second subset of pixels of the second hologram segment to respective other phase values,
performs the error diffusion process on the first pixel to facilitate the localized diffusion of the first error associated with the first pixel to the at least one other pixel of the set of pixels,
performs the error diffusion process on the last pixel to facilitate diffusion of at least the portion of the second error associated with the last pixel to a third subset of pixels of the set of pixels that is in proximity to the last pixel, wherein the third subset of pixels comprises the second neighbor pixels,
performs an error redistribution process in connection with the last pixel to facilitate redistribution of at least the other portion of the second error associated with the last pixel to the second hologram segment, or
performs the error redistribution process in connection with another last pixel of the second subset of pixels of the second hologram segment to facilitate redistribution of at least a portion of a third error associated with the other last pixel to a third hologram segment that is adjacent to the second hologram segment.

10. The system of claim 1, wherein the hologram processor component determines the second neighbor pixels of the set of pixels that are in proximity to the last pixel in the complex hologram and have not been scanned.

11. The system of claim 10, wherein the second neighbor pixels does not include any other pixel of the set of pixels that is in the second hologram segment.

12. The system of claim 1, wherein the hologram processor component updates respective complex values of the second neighbor pixels, based at least in part on the second error, to facilitate the diffusion of at least the portion of the second error to the second neighbor pixels.

13. The system of claim 1, wherein the hologram processor component determines that a specified pixel of the set of pixels is a dead pixel based at least in part on the specified pixel being determined to be opaque, being determined to be transparent with no phase shift, or being determined to have a constant phase shift.

14. The system of claim 13, wherein the hologram processor component modifies a value associated with the dead pixel based at least in part on a determination of whether the dead pixel is opaque, a determination of whether the dead pixel is transparent, a determination of whether there is a phase shift associated with the dead pixel, or a determination of whether there a constant amount of phase associated with the dead pixel.

15. The system of claim 1, wherein the hologram processor component modifies at least one of a coefficient value associated with an update of a complex value of a neighbor pixel that is in proximity to the pixel in the complex hologram, or a weighting value associated with the update of the complex value of the neighbor pixel, based at least in part on a number of neighbor pixels in proximity to the pixel that are determined to be dead pixels.

16. The system of claim 1, wherein the computer-executable components further comprise a display component that facilitates display of a holographic image based at least in part on the phase hologram.

17. The system of claim 16, wherein the display component comprises a phase-only display device.

18. The system of claim 17, wherein the display component comprises at least one of a phase-only spatial light modulator display device, a phase-only liquid crystal on silicon display device, or a phase-only liquid crystal display device.

19. The system of claim 1, wherein the object scene is a real or synthesized three-dimensional object scene, the complex hologram is a full-parallax three-dimensional hologram that represents the real or synthesized three-dimensional object scene, and the holographic image is a three-dimensional full-parallax holographic image based at least in part on the phase hologram.

20. A method, comprising:
converting, by a system comprising a processor, a first complex value of a first member of a first subset of members of a first hologram portion of a complex hologram to a first phase value, wherein the complex hologram represents an object scene, wherein the complex hologram comprises a magnitude portion and a phase portion, wherein the complex hologram is partitioned into a set of hologram portions comprising the first hologram portion and a second hologram portion that is adjacent to the first hologram portion in a row of the complex hologram, wherein the first hologram portion comprises the first member, a second member, and a last member, and wherein the second hologram portion comprises a second-hologram-portion member that is adjacent to the last member of the first hologram portion in the row of the complex hologram;

49 converting, by the system, a last complex value of the last member to a last phase value at a future time after the converting the first complex value of the first member to the first phase value;

to facilitate generating a phase hologram that corresponds to the complex hologram, performing, by the system, an error diffusion process to facilitate diffusing a first error associated with the converting of the first complex value to the first phase value and a second error associated with the converting of the last complex value to the last phase value, wherein the first error is diffused to first neighbor members, comprising the second member, that are in proximity to the first member in the complex hologram based at least in part on first defined values, wherein at least a portion of the second error is diffused to second neighbor members that are in proximity to the last member in the complex hologram based at least in part on second defined values, and wherein the second neighbor members comprise members other than the second-hologram-portion member; and performing, by the system, an error redistribution process in connection with the last member to facilitate redistributing another portion of the second error associated with the last member to the second hologram portion that is in proximity to the last member of the first hologram portion, wherein a low-pass filter is applied to the last member to facilitate the redistributing of at least the other portion of the second error associated with the last member by diffusion of at least the other portion of the second error to the second hologram portion that is in proximity to the last member.

21. The method of claim 20, further comprising:
partitioning, by the system, the complex hologram into the set of hologram portions.

22. The method of claim 20, further comprising:
analyzing, by the system, the first member to facilitate the converting of the first complex value of the first member to the first phase value.

23. The method of claim 20, further comprising:
modifying, by the system, a magnitude value of a first magnitude portion of the first member to a defined value to facilitate the converting of the first complex value of the first member to the first phase value.

24. The method of claim 20, wherein members of the complex hologram are arranged in a set of rows, comprising the first row and a second row, wherein the first row comprises a first subset of members of the first hologram portion and a second subset of members of the second hologram portion of the set of hologram portions, wherein the first subset of members comprises the first member, the second member, and the last member, wherein the second subset of members comprises the second-hologram-portion member, and wherein the method further comprises:
in accordance with the error diffusion process,
analyzing, by the system, the first subset of members of the first hologram portion proceeding from the first member of the first subset at one side of the first hologram portion to the last member of the first subset at another side of the first hologram portion.

25. The method of claim 20, further comprising:
convolving, by the system, the phase hologram with a low-pass function to facilitate the applying of the low-pass filter in connection with the error redistribution process.

50

26. The method of claim 20, further comprising:
determining, by the system, a subset of neighbor members with respect to the first member, wherein the subset of neighbor members comprises the first neighbor members that are in proximity to the first member in the first hologram portion and have not been visited in connection with converting respective complex values of the neighbor members to respective phase values.

27. The method of claim 20, further comprising:
modifying, by the system, respective complex values of the first neighbor members, based at least in part on the first error, to facilitate the diffusing of the first error to the first neighbor members.

28. The method of claim 20, further comprising:
determining, by the system, that a neighbor member of the first member is a dead member, in response to determining that the neighbor member is opaque, determining that the neighbor member is transparent with no phase shift, or determining that the neighbor member has a constant phase shift, wherein the neighbor member is in proximity to the first member in the complex hologram; and adjusting, by the system, a value associated with the dead member based at least in part on a result of determining whether the dead member is opaque, a result of determining whether the dead member is transparent, a result of determining whether there is a phase shift associated with the dead member, or a result of determining whether there a constant amount of phase associated with the dead member.

29. The method of claim 20, further comprising:
adjusting, by the system, a defined value of the first defined values that is associated with an update of a complex value of a neighbor member located in proximity to the first member in the complex hologram, based at least in part on a number of neighbor members in proximity to the first member that are determined to be dead members, wherein the defined value is at least one of a coefficient value or a weighting value.

30. The method of claim 20, wherein the object scene is a real or synthesized three-dimensional object scene, the complex hologram is a full-parallax three-dimensional hologram that represents the real or synthesized three-dimensional object scene, and the holographic image is a three-dimensional full-parallax holographic image based at least in part on the phase hologram.

31. A non-transitory computer-readable medium storing computer-executable instructions that, in response to execution, cause a system comprising a processor to perform operations, comprising:
partitioning a complex hologram, comprising a set of members, into a set of hologram segments comprising a first hologram segment that comprises a first subset of members of the set of members and a second hologram segment that comprises a second subset of members of the set of members and is adjacent to the first hologram segment in a row of the complex hologram, wherein the first hologram segment comprises the first member, a second member, and an end-segment member, wherein the second hologram segment comprises a second-hologram-segment member that is adjacent to the end-segment member of the first hologram segment in the row of the complex hologram, and wherein the complex hologram comprises a magnitude portion and a phase portion and represents an object scene;

modifying a first complex value of a first member of the first subset of members of the first hologram segment to a first phase-only value;

modifying a second complex value of the end-segment member of the first subset of members to a second phase-only value;

to facilitate generating a phase-only hologram that corresponds to the complex hologram, applying an error diffusion process to facilitate diffusing a first error associated with the modifying of the first complex value to the first phase-only value and a portion of a second error associated with the modifying of the second complex value to the second phase-only value, wherein the first error is diffused to first neighbor members, comprising the second member, that are in proximity to the first member in the complex hologram based at least in part on first defined weighting values, wherein the portion of the second error is diffused to second neighbor members that are in proximity to the end-segment member in the complex hologram based at least in part on second defined weighting values, and wherein the second neighbor members do not include the second-hologram-segment member; and applying an error redistribution process in connection with the end-segment member to facilitate redistributing another portion of the second error associated with the end-segment member to the second hologram portion that is in proximity to the end-segment member, wherein a low-pass filter is applied to the end-segment member to facilitate the redistributing of at least the other portion of the second error associated with the end-segment member by diffusion of at least the other portion of the second error to the second hologram portion that is in adjacent to the end-segment member.

32. The non-transitory computer-readable medium of claim 31, further comprising:

to facilitate applying the low-pass filter in connection with the applying of the error distribution process, convolving the phase-only hologram with a low-pass function in the frequency domain.

33. A system, comprising:

means for partitioning a complex hologram, comprising a set of pixels, into a set of hologram portions comprising a first hologram portion that comprises a first subset of pixels of the set of pixels and a second hologram portion that comprises a second subset of pixels of the set of pixels, wherein the complex hologram comprises a magnitude portion and a phase portion and represents an object scene, wherein the second hologram portion is adjacent to the first hologram portion in a row of the complex hologram, wherein the first subset of pixels comprises a first pixel, a second pixel, and a last pixel, and wherein the second subset of pixels comprises a first second-hologram-portion pixel that is adjacent to the last pixel in the row;

means for converting complex values of pixels of the first subset of pixels of the first hologram portion to phase values, wherein a first complex value of the first pixel is converted to a first phase value, and a last complex value of the last pixel is converted to a last phase value;

means for performing an error diffusion process in connection with the first pixel to facilitate diffusing a first error associated with the converting of the first complex value to the first phase value, and in connection with the last pixel to facilitate diffusing at least a portion of a second error associated with the converting of the last complex value to the last phase value, to facilitate generating a phase hologram that corresponds to the complex hologram, wherein the first error is diffused to first neighbor pixels, comprising the second pixel, that are in proximity to the first pixel in the complex hologram based at least in part on first coefficient values, wherein at least the portion of the second error is diffused to second neighbor pixels that are in proximity to the last pixel in the complex hologram based at least in part on second coefficient values, and wherein the second neighbor pixels do not include the second-hologram-portion pixel; and means for performing an error redistribution process in connection with the last pixel to facilitate redistributing at least another portion of the second error associated with the last pixel to the second hologram portion that is adjacent to the last pixel, wherein a low-pass filter is applied to the last pixel to facilitate redistribution of at least the other portion of the second error associated with the last pixel by diffusion of at least the other portion of the second error to the second hologram segment.

34. The system of claim 33, further comprising:

means for modifying respective complex values of the first neighbor pixels, based at least in part on the first error, to facilitate the diffusing of the first error to the first neighbor pixels.

* * * * *